US010421124B2

(12) United States Patent
Jepeal et al.

(10) Patent No.: US 10,421,124 B2
(45) Date of Patent: Sep. 24, 2019

(54) DEBINDER FOR 3D PRINTED OBJECTS

(71) Applicant: Desktop Metal, Inc., Burlington, MA (US)

(72) Inventors: Daniel R. Jepeal, Andover, MA (US); Paul E. Dresens, Wayland, MA (US)

(73) Assignee: Desktop Metal, Inc., Burlington, MA (US)

( * ) Notice: Subject to any disclaimer, the term of this patent is extended or adjusted under 35 U.S.C. 154(b) by 0 days.

(21) Appl. No.: 15/938,520

(22) Filed: Mar. 28, 2018

(65) Prior Publication Data
US 2019/0076924 A1 Mar. 14, 2019

Related U.S. Application Data

(60) Provisional application No. 62/557,531, filed on Sep. 12, 2017.

(51) Int. Cl.
*B22F 3/10* (2006.01)
*B29C 64/30* (2017.01)
(Continued)

(52) U.S. Cl.
CPC ............ *B22F 3/1025* (2013.01); *B01D 3/02* (2013.01); *B01D 5/006* (2013.01); *B22F 3/008* (2013.01); *B22F 3/1021* (2013.01); *B29C 64/30* (2017.08); *B29C 64/307* (2017.08); *B29C 64/35* (2017.08); *B29C 71/0009* (2013.01); *B33Y 30/00* (2014.12); *B33Y 40/00* (2014.12); *C04B 35/638* (2013.01); *B22F 3/003* (2013.01); *B22F 3/1055* (2013.01); *B22F 2003/1056* (2013.01);
(Continued)

(58) Field of Classification Search
CPC ........ B22F 3/1025; B22F 3/008; B29C 64/30; B29C 64/307; B29C 71/0009; B01D 5/006
See application file for complete search history.

(56) References Cited

U.S. PATENT DOCUMENTS 5,064,463 A 11/1991 Ciomek
5,143,663 A * 9/1992 Leyden ................ B29C 64/135
118/423
(Continued)

OTHER PUBLICATIONS

Anonymous: "Plansee simplifies MIM hot zone door operation", Industry News, Powder Injection Moulding International, vol. 7, No. 2, p. 8, Jun. 1, 2013.
(Continued)

*Primary Examiner* — Joseph S Del Sole
*Assistant Examiner* — Emmanuel S Luk
(74) *Attorney, Agent, or Firm* — Brookoff McAndrews, PLLC

(57) ABSTRACT

A debinder provides for debinding printed green parts in an additive manufacturing system. The debinder can include a storage chamber, a process chamber, a distill chamber, a waste chamber, and a condenser. The storage chamber stores a liquid solvent for debinding the green part. The process chamber debinds the green part using a volume of the liquid solvent transferred from the storage chamber. The distill chamber collects a solution drained from the process chamber and produces a solvent vapor from the solution. The condenser condenses the solvent vapor to the liquid solvent and transfer the liquid solvent to the storage chamber. The waste chamber collects a waste component of the solution.

26 Claims, 12 Drawing Sheets

(51) Int. Cl.
*B01D 5/00* (2006.01)
*B33Y 70/00* (2015.01)
*B33Y 40/00* (2015.01)
*B29C 64/307* (2017.01)
*B29C 71/00* (2006.01)
*B22F 3/00* (2006.01)
*C04B 35/638* (2006.01)
*B33Y 30/00* (2015.01)
*B29C 64/35* (2017.01)
*B01D 3/02* (2006.01)
*B29K 505/00* (2006.01)
*B22F 3/105* (2006.01)

(52) U.S. Cl.
CPC ... *B22F 2003/1059* (2013.01); *B22F 2998/10* (2013.01); *B22F 2999/00* (2013.01); *B29K 2505/00* (2013.01); *B33Y 70/00* (2014.12); *C04B 2235/6026* (2013.01)

(56) References Cited

U.S. PATENT DOCUMENTS

| | | | | |
|---|---|---|---|---|
| 5,248,456 | A * | 9/1993 | Evans, Jr. | B33Y 40/00 118/423 |
| 5,531,958 | A | 7/1996 | Krueger | |
| 5,613,183 | A * | 3/1997 | Wiech, Jr. | B22F 1/0077 264/612 |
| 5,627,258 | A | 5/1997 | Takayama et al. | |
| 5,976,457 | A * | 11/1999 | Amaya | B22C 1/00 419/36 |
| 5,985,208 | A | 11/1999 | Zedalis et al. | |
| 6,159,345 | A * | 12/2000 | Donnelly | B01D 3/007 202/160 |
| 6,802,137 | B1 * | 10/2004 | Gray | F26B 21/145 34/340 |
| 9,250,013 | B2 * | 2/2016 | Kemper | F26B 17/005 |
| 2002/0187065 | A1 | 12/2002 | Amaya et al. | |
| 2003/0111771 | A1 * | 6/2003 | Gybin | G03F 7/0017 264/400 |
| 2005/0229737 | A1 * | 10/2005 | Tsuno | B29C 65/002 74/490.09 |
| 2014/0265047 | A1 * | 9/2014 | Burris | B23K 26/034 264/497 |
| 2015/0034129 | A1 * | 2/2015 | Chou | B22F 3/225 134/26 |
| 2015/0047681 | A1 * | 2/2015 | Hsu | B22F 3/003 134/104.4 |
| 2015/0047682 | A1 * | 2/2015 | Chou | C23G 5/04 134/108 |
| 2016/0207147 | A1 * | 7/2016 | Van Hassel | B33Y 10/00 |
| 2016/0244863 | A1 * | 8/2016 | Miyano | B03C 1/02 |
| 2018/0154437 | A1 * | 6/2018 | Mark | B22F 3/008 |
| 2018/0154438 | A1 * | 6/2018 | Mark | B29C 64/118 |
| 2018/0154439 | A1 * | 6/2018 | Mark | B29C 64/118 |
| 2018/0154574 | A1 * | 6/2018 | Mark | B29C 64/118 |
| 2018/0154580 | A1 * | 6/2018 | Mark | B29C 64/118 |
| 2018/0221950 | A1 * | 8/2018 | Mark | B22F 3/008 |
| 2018/0236546 | A1 * | 8/2018 | Mark | B22F 3/008 |

OTHER PUBLICATIONS

Banerjee, et al., "Debinding and sintering of metal injection molding (MIM) components:", Handbook of metal injection molding, Chapter 7, pp. 133-180, Jun. 11, 2012.

International Search Report and Written Opinion dated Dec. 5, 2018 for International Application No. PCT/US2018/050740, entitled "Debinder for 3D Printed Objects", 18 pages.

* cited by examiner

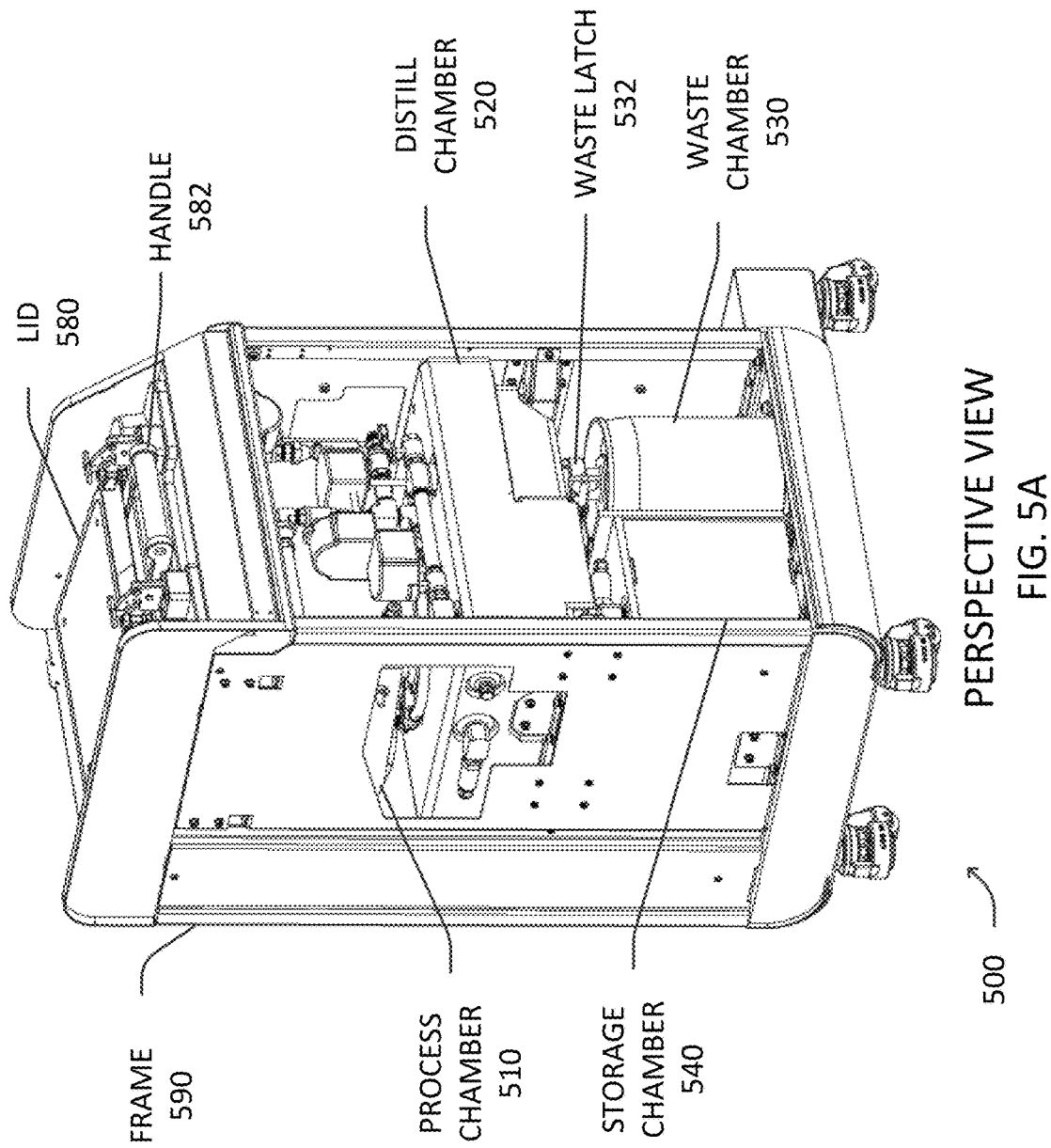

FRONT VIEW

REAR VIEW

DEBINDER FOR 3D PRINTED OBJECTS

RELATED APPLICATION

This application claims the benefit of U.S. Provisional Application No. 62/557,531, filed on Sep. 12, 2017. The entire teachings of the above application are incorporated herein by reference.

BACKGROUND

Metal injection molding (MIM) is a metalworking process useful in creating a variety of metal objects. A mixture of powdered metal and binder (e.g., a polymer such as polypropylene) forms a "feedstock" capable of being molded, at a high temperature, into the shape of a desired object or part. The initial molded part, also referred to as a "green part," then undergoes a debinding process to remove the binder, followed by a sintering process. During sintering, the part is brought to a temperature near the melting point of the powdered metal, which evaporates any remaining binder and forming the metal powder into a solid mass, thereby producing the desired object.

Additive manufacturing, also referred to as 3D printing, includes a variety of techniques for manufacturing a three-dimensional object via an automated process of forming successive layers of the object. 3D printers may utilize a feedstock comparable to that used in MIM, thereby creating a green part without the need for a mold. The green part may then undergo comparable debinding and sintering processes to produce the finished object.

SUMMARY

Example embodiments a debinder system for debinding fabricated green parts. The debinder system may include a storage chamber, a process chamber, a distill chamber, a waste chamber, and a condenser. The storage chamber may be configured to store a liquid solvent for debinding the green part. The process chamber may be configured to debind the green part using a volume of the liquid solvent transferred from the storage chamber. The distill chamber may be configured to collect a solution drained from the process chamber and produce a solvent vapor from the solution. The condenser may be configured to condense the solvent vapor to the liquid solvent and transfer the liquid solvent to the storage chamber. The waste chamber may be coupled to the distill chamber and configured to collect a waste component of the solution.

In further embodiments, a controller may be configured to determine parameters of the debinding based on properties of the green part. The parameters can include, for example, debind time, circulation of the solvent, and solvent exchange during the debind. The properties of the green part can include geometry and/or mass. The controller can be further configured to instruct a user regarding positioning the green part within the process chamber.

In still further embodiments, the waste chamber can be removably coupled to the distill chamber. The process chamber may be accessible via a lid that automatically locks during the debind, and the storage chamber may be removable from the system. The process chamber and distill chamber may be configured to substantially prevent evaporated solvent from exiting the system. The debinder may also include a purging device configured to purge evaporated solvent from the process chamber, the purging device including at least one of a fan, a blower, a pump, and a compressor.

Further embodiments include a method of debinding a part. At a process chamber, a green part may be immersed with a volume of a liquid solvent transferred from a storage chamber to effect a debind of the green part. Temperature and/or circulation of the volume of liquid solvent may be controlled. Once the part is debinded, a solution may be drained from the process chamber into a distill chamber, and then distilled in the distill chamber to produce a solvent vapor. The solvent vapor may then be condensed to the liquid solvent and transferred to the storage chamber. A waste component of the solution may be collected to a waste chamber coupled to the distill chamber.

In further embodiments, parameters of the debinding may be determined based on properties of the green part. The parameters can include, for example, debind time, circulation of the solvent, and solvent exchange during the debind. The properties of the green part can include geometry and/or mass. A user may be instructed regarding positioning the green part within the process chamber.

In still further embodiments, the waste chamber may be removed from the distill chamber, and a replacement waste chamber can be connected to the distill chamber. Alternatively, the waste chamber can be reconnected to the distill chamber upon removing the waste component from the waste chamber. A lid to the process chamber can be automatically locked during the debind. The storage chamber may be removed and replaced, and evaporated solvent may be substantially prevented from exiting to the environment. Heat may be applied to the process chamber following the draining to dry the parts. Air pressure may be applied to the process chamber to purge solvent vapors from the process chamber.

Further embodiments include a debinder system including a storage chamber, a process chamber, a distill chamber, and a condenser. The storage chamber may be configured to store a liquid solvent for debinding a green part. The process chamber may be configured to debind the green part using a volume of the liquid solvent transferred from the storage chamber. The distill chamber may be configured to 1) collect a solution drained from the process chamber, 2) produce a solvent vapor from the solution, and 3) collect a waste component of the solution. The condenser may be configured to condense the solvent vapor to the liquid solvent and transfer the liquid solvent to the storage chamber.

Still further embodiments may include a debinder system including a process chamber, a distill chamber, and a condenser. The process chamber may be configured to debind a green part using a volume of a liquid solvent. The distill chamber may be configured to collect a solution drained from the process chamber and produce a solvent vapor from the solution. The condenser may be configured to condense the solvent vapor to the liquid solvent and transfer the liquid solvent to the process chamber. In further embodiments, the debinder may also include a waste chamber coupled to the distill chamber and configured to collect a waste component of the solution.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 5A-C are schematic illustrations of a debinder in an example embodiment.

DETAILED DESCRIPTION

A description of example embodiments follows.

Figure 1:
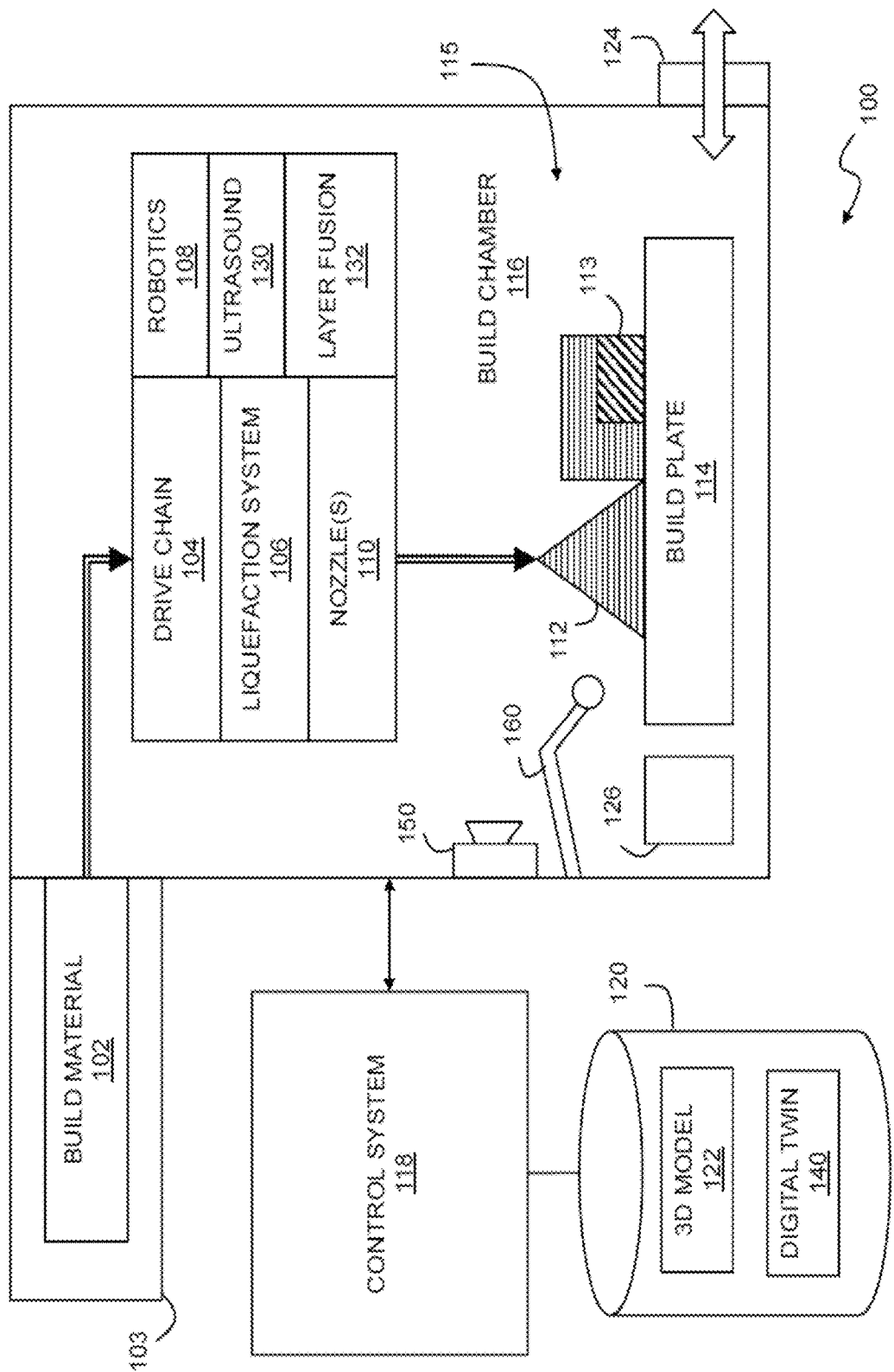
FIG. 1 is a block diagram of an additive manufacturing system.

FIG. 1 is a block diagram of an additive manufacturing system for use with composites. The additive manufacturing system may include a three-dimensional printer 100 (or simply printer 100) that deposits metal using fused filament fabrication. Fused filament fabrication is well known in the art, and may be usefully employed for additive manufacturing with suitable adaptations to accommodate the forces, temperatures and other environmental requirements typical of the metallic injection molding materials described herein. In general, the printer 100 may include a build material 102 that is propelled by a drive train 104 and heated to a workable state by a liquefaction system 106, and then dispensed through one or more nozzles 110. By concurrently controlling robotic system 108 to position the nozzle(s) along an extrusion path, an object 112 (also referred to as a part) may be fabricated on a build plate 114 within a build chamber 116. In general, a control system 118 manages operation of the printer 100 to fabricate the object 112 according to a three-dimensional model using a fused filament fabrication process or the like.

A variety of commercially available compositions have been engineered for metal injection molding ("MIM"). These highly engineered materials can also be adapted for use as a build material 102 in printing techniques such as fused filament fabrication. For example, MIM feedstock materials, when suitably shaped, may be usefully extruded through nozzles typical of commercially available FFF machines, and are generally flowable or extrudable within typical operating temperatures (e.g., 160-250 degrees Celsius) of such machines. This temperature range may depend on the binder—e.g., some binders achieve appropriate viscosities at about 205 degrees Celsius, while others achieve appropriate viscosities at lower temperatures such as about 160-180 C degrees Celsius. One of ordinary skill will recognize that these ranges (and all ranges listed herein) are provided by way of example and not of limitation. Further, while there are no formal limits on the dimensions for powder metallurgy materials, parts with dimensions of around 100 millimeters on each side have been demonstrated to perform well for FFF fabrication of net shape green bodies. Any smaller dimensions may be usefully employed, and larger dimensions may also be employed provided they are consistent with processing dimensions such as the print resolution and the extrusion orifice diameter. For example, implementations target about a 0.300 μm diameter extrusion, and the MIM metal powder may typically be about 1~22 μm diameter, although nano sized powders can be used. The term metal injection molding material, as used herein, may include any such engineered materials, as well as other fine powder bases such as ceramics in a similar binder suitable for injection molding. Thus, where the term metal injection molding or the commonly used abbreviation, MIM, is used, the term may include injection molding materials using powders other than, or in addition to, metals and, thus, may include ceramics. Also, any reference to "MIM materials," "powder metallurgy materials," "MIM feedstocks," or the like may generally refer to metal powder and/or ceramic powder mixed with one or more binding materials, e.g., a backbone binder that holds everything together and a bulk binder that carries the metal and backbone into position within a mold or print. Other material systems may be suitable for fabricating metal parts using fabrication techniques such as stereolithography or binder jetting, some of which are discussed in greater detail below. Such fabrication techniques may, in some applications, be identical to techniques for fabricating parts from ceramic material.

In general, fabrication of such materials may proceed as with a conventional FFF process, except that after the net shape is created, the green part may be optionally machined or finished while in a more easily workable state, and then debound and sintered into a final, dense object using any of the methods common in the art for MIM materials. The final object, as described above, may include a metal, a metal alloy, a ceramic, or another suitable combination of materials.

The build material 102 may be fed from a carrier 103 configured to dispense the build material to the three-dimensional printer either in a continuous (e.g., wire) or discrete (e.g., billet) form. The build material 102 may for example be supplied in discrete units one by one as billets or the like into an intermediate chamber for delivery into the build chamber 118 and subsequent melt and deposition. The carrier 103 may include a spool or cartridge containing the build material 102 in a wire form. Where a vacuum or other controlled environment is desired, the wire may be fed through a vacuum gasket into the build chamber 118 in a continuous fashion, however, typical MIM materials can be heated to a workable plastic state under normal atmospheric conditions, except perhaps for filtering or the like to remove particles from the build chamber 116. Thus, a MIM build material may be formed into a wire, the build material including an engineered composite of metal powder and a polymeric binder or the like, wherein the carrier 103 is configured to dispense the build material in a continuous feed to a three-dimensional printer. For environmentally sensitive materials, the carrier 103 may provide a vacuum environment for the build material 102 that can be directly or indirectly coupled to the vacuum environment of the build chamber 118. More generally, the build chamber 118 (and the carrier 103) may maintain any suitably inert environment for handling of the build material 102, such as a vacuum, and oxygen-depleted environment, an inert gas environment, or some gas or combination of gasses that are not reactive with the build material 102 where such conditions are necessary or beneficial during three-dimensional fabrication.

A drive train 104 may include any suitable gears, compression pistons, or the like for continuous or indexed feeding of the build material 116 into the liquefaction system 106. The drive train 104 may include gear shaped to mesh with corresponding features in the build material such as ridges, notches, or other positive or negative detents. The drive train 104 may use heated gears or screw mechanisms to deform and engage with the build material. Thus, a printer for a fused filament fabrication process can heats a build material to a working temperature, and that heats a gear that engages with, deforms, and drives the composite in a feed path. A screw feed may also or instead be used.

For more brittle MIM materials, a fine-toothed drive gear of a material such as a hard resin or plastic may be used to grip the material without excessive cutting or stress concentrations that might otherwise crack, strip, or otherwise compromise the build material.

The drive train 104 may use bellows, or any other collapsible or telescoping press to drive rods, billets, or similar units of build material into the liquefaction system 106. Similarly, a piezoelectric or linear stepper drive may be used to advance a unit of build media in a non-continuous, stepped method with discrete, high-powered mechanical increments. Further, the drive train 104 may include multiple stages. In a first stage, the drive train 104 may heat the composite material and form threads or other features that can supply positive gripping traction into the material. In the next stage, a gear or the like matching these features can be used to advance the build material along the feed path. A collet feed may be used (e.g., similar to those on a mechanical pencil). A soft wheel or belt drive may also or instead be used. A shape forming wheel drive may be used to ensure accuracy of size and thus the build. More generally, the drive train 104 may include any mechanism or combination of mechanisms used to advance build material 102 for deposition in a three-dimensional fabrication process.

The liquefaction system 106 may be any liquefaction system configured to heat the composite to a working temperature in a range suitable for extrusion in a fused filament fabrication process. Any number of heating techniques may be used. Electrical techniques such as inductive or resistive heating may be usefully applied to liquefy the build material 102. This may, for example include inductively or resistively heating a chamber around the build material 102 to a temperature at or near the glass transition temperature of the build material 102, or some other temperature where the binder or other matrix becomes workable, extrudable, or flowable for deposition as described herein. Where the contemplated build materials are sufficiently conductive, they may be directly heated through contact methods (e.g., resistive heating with applied current) or non-contact methods (e.g., induction heating using an external electromagnet to drive eddy currents within the material). The choice of additives may further be advantageously selected to provide bulk electrical characteristics (e.g., conductance/resistivity) to improve heating. When directly heating the build material 102, it may be useful to model the shape and size of the build material 102 in order to better control electrically-induced heating. This may include estimates or actual measurements of shape, size, mass, etc.

In the above context, "liquefaction" does not require complete liquefaction. That is, the media to be used in printing may be in a multi-phase state, and/or form a paste or the like having highly viscous and/or non-Newtonian fluid properties. Thus the liquefaction system 106 may include, more generally, any system that places a build material 102 in condition for use in fabrication.

In order to facilitate resistive heating of the build material 102, one or more contact pads, probes or the like may be positioned within the feed path for the material in order to provide locations for forming a circuit through the material at the appropriate location(s). In order to facilitate induction heating, one or more electromagnets may be positioned at suitable locations adjacent to the feed path and operated, e.g., by the control system 118, to heat the build material internally through the creation of eddy currents. Both of these techniques may be used concurrently to achieve a more tightly controlled or more evenly distributed electrical heating within the build material. The printer 100 may also be instrumented to monitor the resulting heating in a variety of ways. For example, the printer 100 may monitor power delivered to the inductive or resistive circuits. The printer 100 may also or instead measure temperature of the build material 102 or surrounding environment at any number of locations. The temperature of the build material 102 may be inferred by measuring, e.g., the amount of force required to drive the build material 102 through a nozzle 110 or other portion of the feed path, which may be used as a proxy for the viscosity of the build material 102. More generally, any techniques suitable for measuring temperature or viscosity of the build material 102 and responsively controlling applied electrical energy may be used to control liquefaction for a fabrication process using composites as described herein.

The liquefaction system 106 may also or instead include any other heating systems suitable for applying heat to the build material 102 to a suitable temperature for extrusion. This may, for example include techniques for locally or globally augmenting heating using, e.g., chemical heating, combustion, ultrasound heating, laser heating, electron beam heating or other optical or mechanical heating techniques and so forth.

The liquefaction system 106 may include a shearing engine. The shearing engine may create shear within the composite as it is heated in order to maintain a mixture of the metallic base and a binder or other matrix, or to maintain a mixture of various materials in a paste or other build material. A variety of techniques may be employed by the shearing engine. The bulk media may be axially rotated as it is fed along the feed path into the liquefaction system 106. Further, one or more ultrasonic transducers may be used to introduce shear within the heated material. Similarly, a screw, post, arm, or other physical element may be placed within the heated media and rotated or otherwise actuated to mix the heated material. Bulk build material may include individual pellets, rods, or coils (e.g., of consistent size) and fed into a screw, a plunger, a rod extruder, or the like. For example, a coiled build material can be uncoiled with a heater system including a heated box, heated tube, or heater from the printer head. Also, a direct feed with no heat that feeds right into the print head is also possible.

The robotic system 108 may include a robotic system configured to three-dimensionally position the nozzle 110 within the working volume 115 of the build chamber 116. This may, for example, include any robotic components or systems suitable for positioning the nozzle 110 relative to the build plate 114 while depositing the composite in a pattern to fabricate the object 112. A variety of robotics systems are known in the art and suitable for use as the robotic system 108 described herein. For example, the robotics may include a Cartesian or xy-z robotics system employing a number of linear controls to move independently in the x-axis, the y-axis, and the z-axis within the build chamber 116. Delta robots may also or instead be usefully employed, which can, if properly configured, provide significant advantages in terms of speed and stiffness, as well as offering the design convenience of fixed motors or drive elements. Other configurations such as double or triple delta robots can increase range of motion using multiple linkages. More generally, any robotics suitable for controlled positioning of the nozzle 110 relative to the build plate 114, especially within a vacuum or similar environment, may be usefully employed including any mechanism or combination of mechanisms suitable for actuation, manipulation, locomotion and the like within the build chamber 116.

The nozzle(s) 110 may include one or more nozzles for dispensing the build material 102 that has been propelled with the drive train 104 and heated with the liquefaction system 106 to a suitable working temperature. In a multi-phase extrusion this may include a working temperature above the melting temperature of the metallic base of the composite, or more specifically between a first temperature at which the metallic base melts and the second temperature (above the first temperature) at which a second phase of the composite remains inert.

The nozzles 110 may, for example, be used to dispense different types of material so that, for example, one nozzle 110 dispenses a composite build material while another nozzle 110 dispenses a support material in order to support bridges, overhangs, and other structural features of the object 112 that would otherwise violate design rules for fabrication with the composite build material. Further, one of the nozzles 110 may deposit a different type of material, such as a thermally compatible polymer or a metal or polymer loaded with fibers of one or more materials to increase tensile strength or otherwise improve mechanical properties of the resulting object 112. Two types of supports may be used—(1) build supports and (2) sinter supports—e.g., using different materials printed into the same part to achieve these supports, or to create a distinguishing junction between these supports and the part.

The nozzle 110 may preferably be formed of a material or combination of materials with suitable mechanical and thermal properties. For example, the nozzle 110 will preferably not degrade at the temperatures wherein the composite material is to be dispensed, or due to the passage of metallic particles through a dispensing orifice therein. While nozzles for traditional polymer-based fused filament fabrication may be made from brass or aluminum alloys, a nozzle that dispenses metal particles may be formed of harder materials, or materials compatible with more elevated working temperatures such as a high carbon steel that is hardened and tempered. Other materials such as a refractory metal (e.g. molybdenum, tungsten) or refractory ceramic (e.g. mullite, corundum, magnesia) may also or instead be employed. In some instances, aluminum nozzles may instead be used for MIM extrusion of certain MIM materials. Further, a softer thermally conductive material with a hard, wear-resistant coating may be used, such as copper with a hard nickel plating.

The nozzle 110 may include one or more ultrasound transducers 130 as described herein. Ultrasound may be usefully applied for a variety of purposes in this context. The ultrasound energy may facilitate extrusion by mitigating clogging by reducing adhesion of a build material to an interior surface of the nozzle 110. A variety of energy director techniques may be used to improve this general approach. For example, a deposited layer may include one or more ridges, which may be imposed by an exit shape of the nozzle 110, to present a focused area to receive ultrasound energy introduced into the interface between the deposited layer and an adjacent layer.

The nozzle 110 may include an induction heating element, resistive heating element, or similar components to directly control the temperature of the nozzle 110. This may be used to augment a more general liquefaction process along the feed path through the printer 100, e.g., to maintain a temperature of the build material 102 during fabrication, or this may be used for more specific functions, such as declogging a print head by heating the build material 102 substantially above the working range, e.g., to a temperature where the composite is liquid. While it may be difficult or impossible to control deposition in this liquid state, the heating can provide a convenient technique to reset the nozzle 110 without more severe physical intervention such as removing vacuum to disassemble, clean, and replace the affected components.

The nozzle 110 may include an inlet gas or fan, e.g., an inert gas, to cool media at the moment it exits the nozzle 110. The resulting gas jet may, for example, immediately stiffen the dispensed material to facilitate extended bridging, larger overhangs, or other structures that might otherwise require support structures underneath.

The object 112 may be any object suitable for fabrication using the techniques described herein. This may include functional objects such as machine parts, aesthetic objects such as sculptures, or any other type of objects, as well as combinations of objects that can be fit within the physical constraints of the build chamber 116 and build plate 114. Some structures such as large bridges and overhangs cannot be fabricated directly using fused filament fabrication or the like because there is no underlying physical surface onto which a material can be deposited. In these instances, a support structure 113 may be fabricated, preferably of a soluble or otherwise readily removable material, in order to support the corresponding feature.

Where multiple nozzles 110 are provided, a second nozzle may usefully provide any of a variety of additional build materials. This may, for example, include other composites, alloys, bulk metallic glass's, thermally matched polymers and so forth to support fabrication of suitable support structures. One of the nozzles 110 may dispense a bulk metallic glass that is deposited at one temperature to fabricate a support structure 113, and a second, higher temperature at an interface to a printed object 112 where the bulk metallic glass can be crystallized at the interface to become more brittle and facilitate mechanical removal of the support structure 113 from the object 112. Conveniently, the bulk form of the support structure 113 can be left in the super-cooled state so that it can retain its bulk structure and be removed in a single piece. Thus, a printer may fabricate a portion of a support structure 113 with a bulk metallic glass in a super-cooled liquid region, and may fabricate a layer of the support structure adjacent to a printed object at a greater temperature in order to crystallize the build material 102 into a non-amorphous alloy. The bulk metallic glass particles may thus be loaded into a MIM feedstock binder system and may provide a support. Pure binding or polymer materials (e.g., without any loading) may also or instead provide a support. A similar metal MIM feedstock may be used for multi-material part creation. Ceramic or dissimilar metal MIM feedstock may be used for a support interface material.

The build plate 114 within the working volume 115 of the build chamber 116 may include a rigid and substantially planar surface formed of any substance suitable for receiving deposited composite or other material(s)s from the nozzles 110. The build plate 114 may be heated, e.g., resistively or inductively, to control a temperature of the build chamber 116 or the surface upon which the object 112 is being fabricated. This may, for example, improve adhesion, prevent thermally induced deformation or failure, and facilitate relaxation of stresses within the fabricated object. Further, the build plate 114 may be a deformable build plate that can bend or otherwise physical deform in order to detach from the rigid object 112 formed thereon.

The build chamber 116 may be any chamber suitable for containing the build plate 114, an object 112, and any other components of the printer 100 used within the build chamber 116 to fabricate the object 112. The build chamber 116 may be an environmentally sealed chamber that can be evacuated with a vacuum pump 124 or similar device in order to provide a vacuum environment for fabrication. This may be particularly useful where oxygen causes a passivation layer that might weaken layer-to-layer bonds in a fused filament fabrication process as described herein, or where particles in the atmosphere might otherwise interfere with the integrity of a fabricated object, or where the build chamber 116 is the same as the sintering chamber. Alternatively, only oxygen may be removed from the build chamber 116.

Similarly, one or more passive or active oxygen getters 126 or other similar oxygen absorbing material or system may usefully be employed within the build chamber 116 to take up free oxygen within the build chamber 116. The oxygen getter 126 may, for example, include a deposit of a reactive material coating an inside surface of the build chamber 116 or a separate object placed therein that completes and maintains the vacuum by combining with or adsorbing residual gas molecules. The oxygen getters 126, or more generally, gas getters, may be deposited as a support material using one of the nozzles 110, which facilitates replacement of the gas getter with each new fabrication run and can advantageously position the gas getter(s) near printed media in order to more locally remove passivating gasses where new material is being deposited onto the fabricated object. The oxygen getters 126 may include any of a variety of materials that preferentially react with oxygen including, e.g., materials based on titanium, aluminum, and so forth. Further, the oxygen getters 126 may include a chemical energy source such as a combustible gas, gas torch, catalytic heater, Bunsen burner, or other chemical and/or combustion source that reacts to extract oxygen from the environment. There are a variety of low-CO and NOx catalytic burners that may be suitably employed for this purpose without CO.

The oxygen getter 126 may be deposited as a separate material during a build process. Thus, a three-dimensional object may be fabricated from a metallic composite, including a physically adjacent structure (which may or may not directly contact the three-dimensional object) fabricated to contain an agent to remove passivating gasses around the three-dimensional object. Other techniques may be similarly employed to control reactivity of the environment within the build chamber 116, or within post-processing chambers or the like as described below. For example, the build chamber 116 may be filled with an inert gas or the like to prevent oxidation.

The control system 118 may include a processor and memory, as well as any other co-processors, signal processors, inputs and outputs, digital-to-analog or analog-to-digital converters and other processing circuitry useful for monitoring and controlling a fabrication process executing on the printer 100. The control system 118 may be coupled in a communicating relationship with a supply of the build material 102, the drive train 104, the liquefaction system 106, the nozzles 110, the build plate 114, the robotic system 108, and any other instrumentation or control components associated with the build process such as temperature sensors, pressure sensors, oxygen sensors, vacuum pumps, and so forth. The control system 118 may be operable to control the robotic system 108, the liquefaction system 106 and other components to fabricate an object 112 from the build material 102 in three dimensions within the working volume 115 of the build chamber 116.

The control system 118 may generate machine ready code for execution by the printer 100 to fabricate the object 112 from the three-dimensional model 122 stored to a database 120. The control system 118 may deploy a number of strategies to improve the resulting physical object structurally or aesthetically. For example, the control system 118 may use plowing, ironing, planing, or similar techniques where the nozzle 110 runs over existing layers of deposited material, e.g., to level the material, remove passivation layers, apply an energy director topography of peaks or ridges to improve layer-to-layer bonding, or otherwise prepare the current layer for a next layer of material. The nozzle 110 may include a low-friction or non-stick surface such as Teflon, TiN or the like to facilitate this plowing process, and the nozzle 110 may be heated and/or vibrated (e.g., using an ultrasound transducer) to improve the smoothing effect. This surface preparation may be incorporated into the initially-generated machine ready code. Alternatively, the printer 100 may dynamically monitor deposited layers and determine, on a layer-by layer basis, whether additional surface preparation is necessary or helpful for successful completion of the object.

Figure 2:
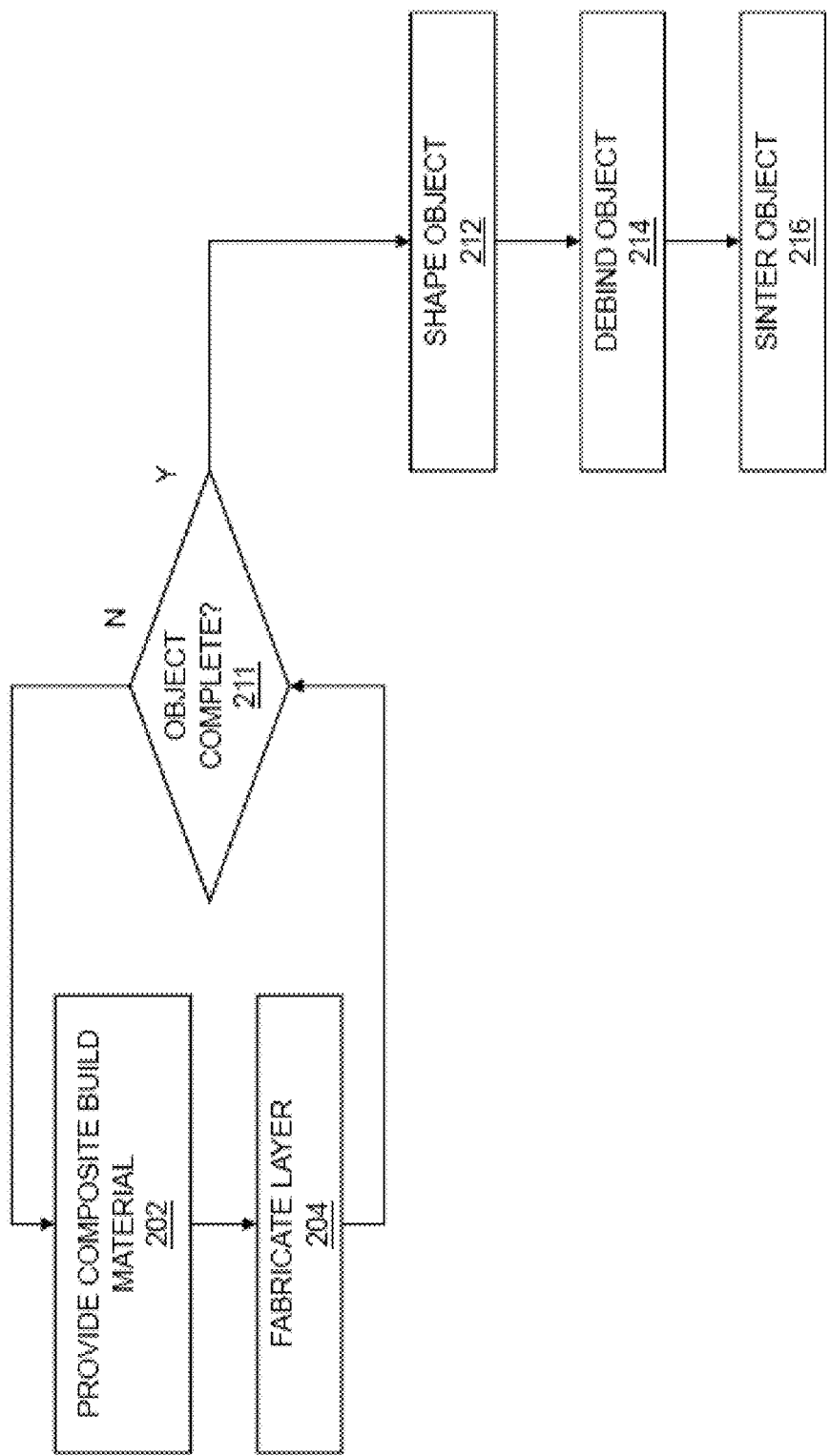
FIG. 2 is a flow chart of a method for printing with composites.

FIG. 2 shows a flow chart of a method for printing with composites, e.g., metal injection molding materials. As shown in step 202, the process 200 may include providing a build material including an injection molding material, or where a support interface is being fabricated, a MIM binder (e.g., a MIM binder with similar thermal characteristics). The material may include, for example, any of the MIM materials described herein. The material may be provided as a build material in a billet, a wire, or any other cast, drawn, extruded or otherwise shaped bulk form. As described above, the build material may be further packaged in a cartridge, spool, or other suitable carrier that can be attached to an additive manufacturing system for use.

As shown in step 204, the process may include fabricating a layer of an object. This may include any techniques that can be adapted for use with MIM materials. For example, this may include fused filament fabrication, jet printing or any other techniques for forming a net shape from a MIM material (and more specifically for techniques used for forming a net shape from a polymeric material loaded with a second phase powder).

As shown in step 211, this process may be continued and repeated as necessary to fabricate an object within the working volume. While the process may vary according to the underlying fabrication technology, an object can generally be fabricated layer by layer based on a three-dimensional model of the desired object. As shown in step 212, the process 200 may include shaping the net shape object after the additive process is complete. Before debinding or sintering, the green body form of the object is usefully in a soft, workable state where defects and printing artifacts can be easily removed, either manually or automatically. Thus the process 200 may take advantage of this workable, intermediate state to facilitate quality control or other process-related steps, such as removal of supports that are required for previous printing steps, but not for debinding or sintering.

As shown in step 214, the process 200 may include debinding the printed object. In general debinding may be performed chemically or thermally to remove a binder that retains a metal (or ceramic or other) powder in a net shape. Contemporary injection molding materials are often engineered for thermal debinding, which advantageously permits debinding and sintering to be performed in a single baking operation, or in two similar baking operations. In general, the debinding process functions to remove binder from the net shape green object, thus leaving a very dense structure of metal (or ceramic or other) particles that can be sintered into the final form.

As shown in step 216, the process 200 may include sintering the printed and debound object into a final form. In general, sintering may be any process of compacting and forming a solid mass of material by heating without liquefaction. During a sintering process, atoms can diffuse across particle boundaries to fuse into a solid piece. Because sintering can be performed at temperatures below the melting temperature, this advantageously permits fabrication with very high melting point materials such as tungsten and molybdenum.

Numerous sintering techniques are known in the art, and the selection of a particular technique may depend upon the build material used, and the desired structural, functional or aesthetic result for the fabricated object. For example, in solid-state (non-activated) sintering, metal powder particles are heated to form connections (or "necks") where they are in contact. Over time, these necks thicken and create a dense part, leaving small, interstitial voids that can be closed, e.g., by hot isostatic pressing (HIP) or similar processes. Other techniques may also or instead be employed. For example, solid state activated sintering uses a film between powder particles to improve mobility of atoms between particles and accelerate the formation and thickening of necks. As another example, liquid phase sintering may be used, in which a liquid forms around metal particles. This can improve diffusion and joining between particles, but also may leave lower-melting phase within the sintered object that impairs structural integrity. Other advanced techniques such as nano-phase separation sintering may be used, for example to form a high-diffusivity solid at the necks to improve the transport of metal atoms at the contact point Debinding and sintering may result in material loss and compaction, and the resulting object may be significantly smaller than the printed object. However, these effects are generally linear in the aggregate, and net shape objects can be usefully scaled up when printing to create a corresponding shape after debinding and sintering.

Figure 3:
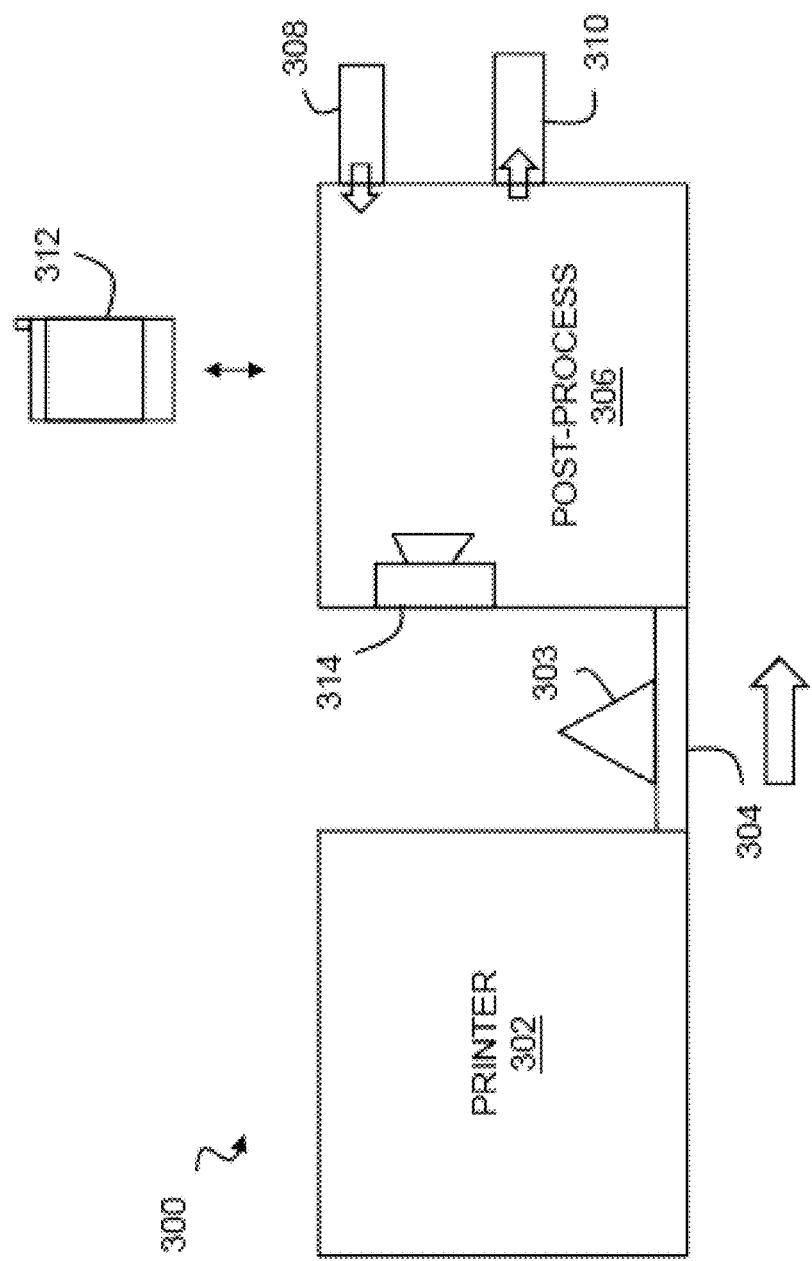
FIG. 3 illustrates an additive manufacturing system for use with metal injection molding materials.

FIG. 3 shows an additive manufacturing system for use with metal injection molding materials. The system 300 may include a printer 302, a conveyor 304, and a postprocessing station 306. In general, the printer 302 may be any of the printers described above including, for example a fused filament fabrication system, a stereolithography system, a selective laser sintering system, or any other system that can be usefully adapted to form a net shape object under computer control using injection molding build materials. The output of the printer 302 may be an object 303 that is a green body including any suitable powder (e.g., metal, metal alloy, ceramic, and so forth, as well as combinations of the foregoing), along with a binder that retains the powder in a net shape produced by the printer 302.

The conveyor 304 may be used to transport the object 303 from the printer 302 to a post-processing station 306 where debinding and sintering can be performed. The conveyor 304 may be any suitable device or combination of devices suitable for physically transporting the object 303. This may, for example, include robotics and a machine vision system or the like on the printer side for detaching the object 303 from a build platform or the like, as well as robotics and a machine vision system or the like on the post-processing side to accurately place the object 303 within the post-processing station 306. Further, the post-processing station 306 may serve multiple printers so that a number of objects can be debound and sintered concurrently, and the conveyor 304 may interconnect the printers and post-processing station so that multiple print jobs can be coordinated and automatically completed in parallel. Alternatively, the object 303 may be manually transported between the two corresponding stations.

The post-processing station 306 may be any system or combination of systems useful for converting a green part formed into a desired net shape from a metal injection molding build material by the printer 302 into a final object. The post-processing station 306 may, for example, include a chemical debinding station and a thermal sintering station that can be used in sequence to produce a final object. Some contemporary injection molding materials are engineered for thermal debinding, which makes it possible to perform a combination of debinding and sintering steps with a single oven or similar device. While the thermal specifications of a sintering furnace may depend upon the powder to be sintered, the binder system, the loading, and other properties of the green object and the materials used to manufacture same, commercial sintering furnaces for thermally debound and sintered MIM parts may typically operate with an accuracy of +/−5 degrees Celsius or better, and temperatures of at least 600 degrees C., or from about 200 degrees C. to about 1900 degrees C. for extended times. Any such furnace or similar heating device may be usefully employed as the post-processing station 306 as described herein. Vacuum or pressure treatment may also or instead be used. Identical or similar material beads with a non-binding coating may be used for a furnace support—e.g., packing in a bed of this material that shrinks similar to the part, except that it will not bond to the part.

Embodiments may be implemented with a wide range of other debinding and sintering processes. For example, the binder may be removed in a chemical debind, thermal debind, or some combination of these. Other debinding processes are also known in the art (such as supercritical or catalytic debinding), any of which may also or instead be employed by the post-processing station 306 as described herein. For example, in a common process, a green part is first debound using a chemical debind, which is following by a thermal debind at a moderately high temperature (in this context, around 700-800 C) to remove organic binder and create enough necks among a powdered material to permit handling. From this stage, the object may be moved to a sintering furnace to remove any remaining components of a binder system densify the object. Alternatively, a pure thermal debind may be used to remove the organic binder. More general, any technique or combination of techniques may be usefully employed to debind an object as described herein.

Similarly, a wide range of sintering techniques may be usefully employed by the post-processing station. For example, an object may be consolidated in a furnace to a high theoretical density using vacuum sintering. Alternatively, the furnace may use a combination of flowing gas (e.g., at below atmosphere, slightly above atmosphere, or some other suitable pressure) and vacuum sintering. More generally, any sintering or other process suitable for improving object density may be used, preferably where the process yields a near-theoretical density part with little or no porosity. Hot-isostatic pressing ("HIP") may also (e.g., as a postsinter finishing step) or instead be employed, e.g., by applying elevated temperatures and pressures of 10-50 ksi, or between about 15 and 30 ksi. Alternatively, the object may be processed using any of the foregoing, followed by a moderate overpressure (greater than the sintering pressure, but lower than HIP pressures). In this latter process, gas may be pressurized at 100-1500 psi and maintained at elevated temperatures within the furnace or some other supplemental chamber. Alternatively, the object may be separately heated in one furnace, and then immersed in a hot granular media inside a die, with pressure applied to the media so that it can be transmitted to the object to drive more rapid consolidation to near full density. More generally, any technique or combination of techniques suitable for removing binder systems and driving a powdered material toward consolidation and densification may be used by the post-processing station 306 to process a fabricated green part as described herein.

The post-processing station 306 may be incorporated into the printer 302, thus removing a need for a conveyor 304 to physically transport the object 303. The build volume of the printer 302 and components therein may be fabricated to withstand the elevated debinding/sintering temperatures. Alternatively, the printer 302 may provide movable walls, barriers, or other enclosure(s) within the build volume so that the debind/sinter can be performed while the object 303 is on a build platform within the printer 302, but thermally isolated from any thermally sensitive components or materials.

The post-processing station 306 may be optimized in a variety of ways for use in an office environment. The post-processing station 306 may include an inert gas source 308. The inert gas source 308 may, for example, include argon or other inert gas (or other gas that is inert to the sintered material), and may be housed in a removable and replaceable cartridge that can be coupled to the post-processing station 306 for discharge into the interior of the post-processing station 306, and then removed and replaced when the contents are exhausted. The post-processing station 306 may also or instead include a filter 310 such as a charcoal filter or the like for exhausting gasses that can be outgassed into an office environment in an unfiltered form. For other gasses, an exterior exhaust, or a gas container or the like may be provided to permit use in unventilated areas. For reclaimable materials, a closed system may also or instead be used, particularly where the environmental materials are expensive or dangerous.

The post-processing station 306 may be coupled to other system components. For example, the post-processing station 306 may include information from the printer 302, or from a controller for the printer, about the geometry, size, mass and other physical characteristics of the object 303 in order to generate a suitable debinding and sintering profile. Optionally, the profile may be created independently by the controller or other resource and transmitted to the post-processing station 306 when the object 303 is conveyed. Further, the post-processing station 306 may monitor the debinding and sintering process and provide feedback, e.g., to a smart phone or other remote device 312, about a status of the object, a time to completion, and other processing metrics and information. The post-processing station 306 may include a camera 314 or other monitoring device to provide feedback to the remote device 312, and may provide time lapse animation or the like to graphically show sintering on a compressed time scale. Post-processing may also or instead include finishing with heat, a hot knife, tools, or similar, and may include applying a finish coat.

Figure 4:
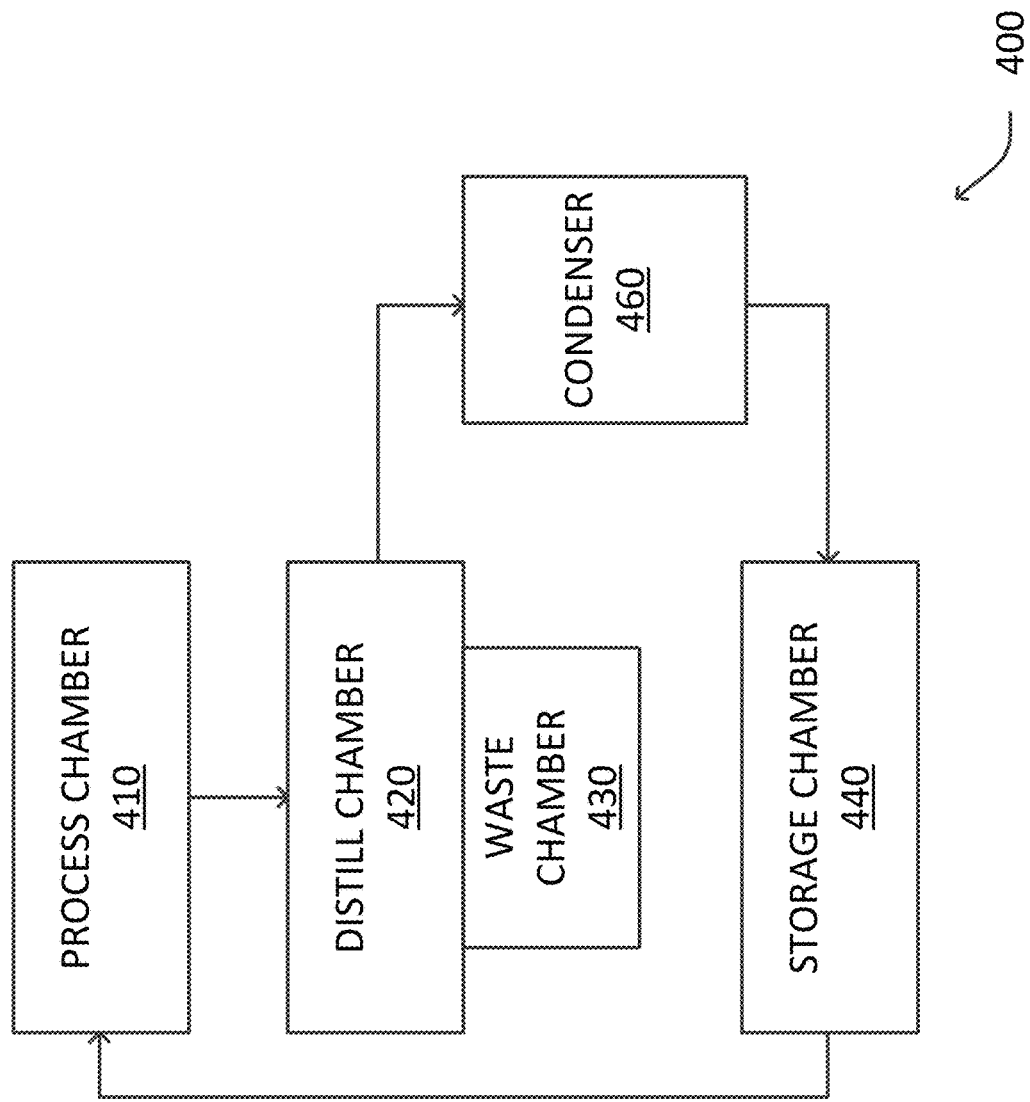
FIG. 4 is a block diagram of a debinder system for debinding printed parts.

FIG. 4 is a block diagram of a debinder system 400 for debinding printed parts. The debinder system 400 may be employed to debind fabricated green parts that are printed as described above with reference to FIGS. 1-3, and may be implemented in the post-processing station 306 of FIG. 4. The system 400 includes a process chamber 410, into which the fabricated green parts may be inserted for debinding. A storage chamber 440 stores a volume of solvent for use in the debinding process. The storage chamber 440 may be filled and refilled with solvent via a port at the storage chamber 440. Alternatively, the storage chamber 440 may be configured to be removable and replaceable to maintain a sufficient amount of solvent within the system 400. For example, the storage chamber 440 may be removed and replaced by a replacement storage chamber (not shown) to replenish the solvent in the system 400, or may be removed, refilled with solvent, and then reconnected within the system 400.

The distill chamber 420 collects the post-debinding solution from the process chamber 410 following the debinding process, and enables distillation of the solvent. A waste chamber 430 may be coupled to the distill chamber 420, and collects waste accumulated in the distill chamber 420 as a result of distillation. The waste chamber 430 may be configured to be removable and replaceable after a number of distillation cycles, wherein the waste chamber 430 may be removed and replaced by a replacement waste chamber (not shown), or may be removed, emptied of waste, and then reconnected to the distill chamber 420. A condenser 460 operates to condense vaporized solvent from the distill chamber 420 and return the liquid solvent to the storage chamber 440.

Figure 5B:
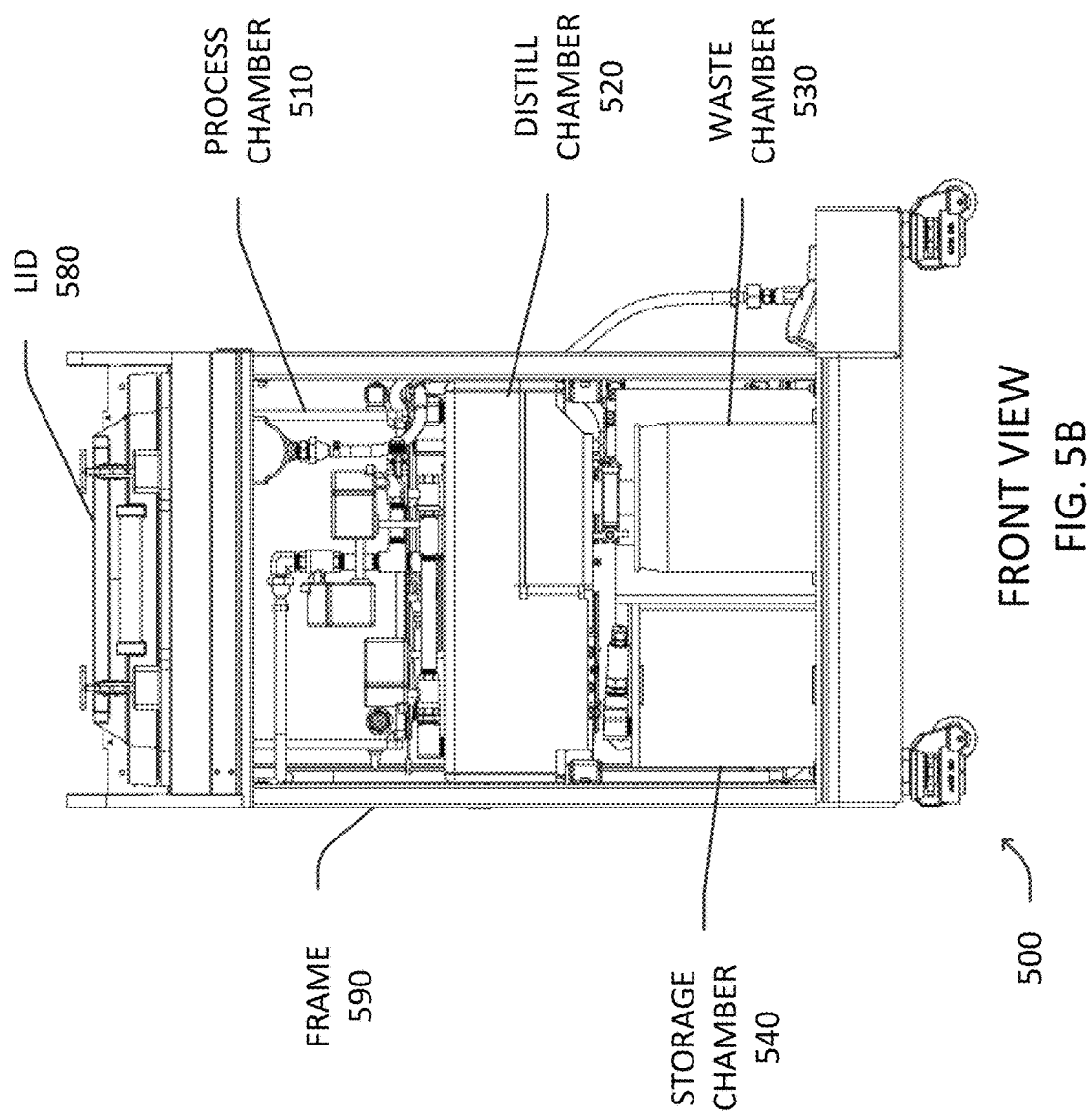
Figure 5C:
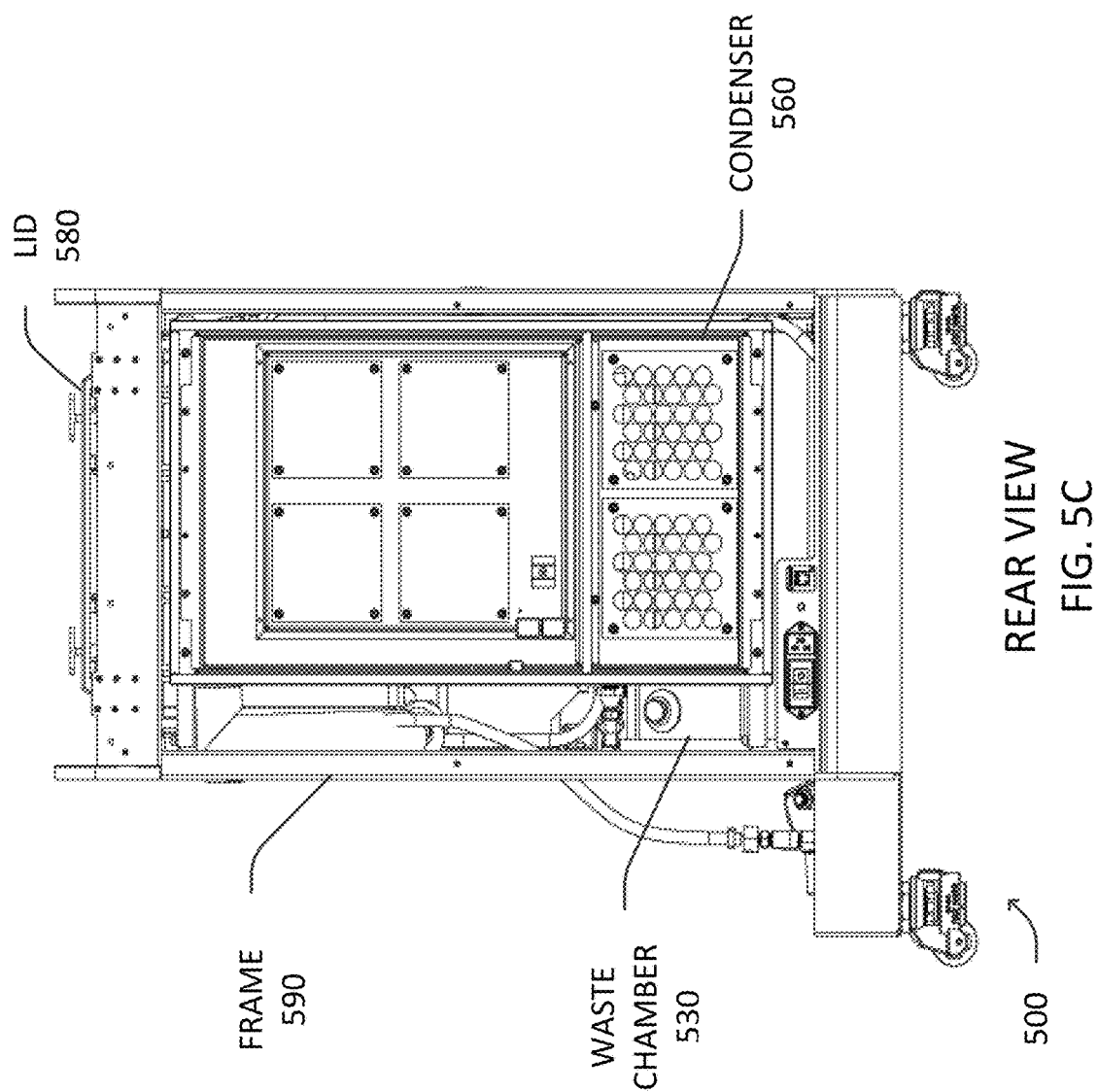

FIGS. 5A-C are schematic illustrations of a debinder system 500, which may incorporate some or all of the features of the debinder system 400 described above with reference to FIG. 4. FIG. 5A shows a perspective view of the system 500, and includes a process chamber 510, distill chamber 520, waste chamber 530, and storage chamber 540 assembled within a frame 590 (shown without external covers for clarity). A lid 580, located at the top of the frame 590, enables the user to access the process chamber 510. FIG. 5B shows a front view of the system 500. FIG. 5C illustrates a rear view, in which a condenser 560 is visible.

As shown in FIGS. 5A-C, the lid 580 includes a handle 582 that may be engaged by a user to open the process chamber 510 by swinging the lid 580 upwards, thereby allowing the user to add or remove parts from the process chamber 510. The lid 580 may include a latch that is controlled by the debinder 500 (or a remote process controller) to automatically lock the lid 580 during a debind, thereby preventing user access as well as preventing solvent vapors from exiting into the environment. The waste chamber 530 may be a cylindrical tank that is removably coupled to the distill chamber 520 via a waste latch 532. The debinder 500 may also include a purging device (e.g., a fan, a blower, a pump, and/or a compressor, not shown) configured to purge evaporated solvent from the process chamber 510.

Figure 6:
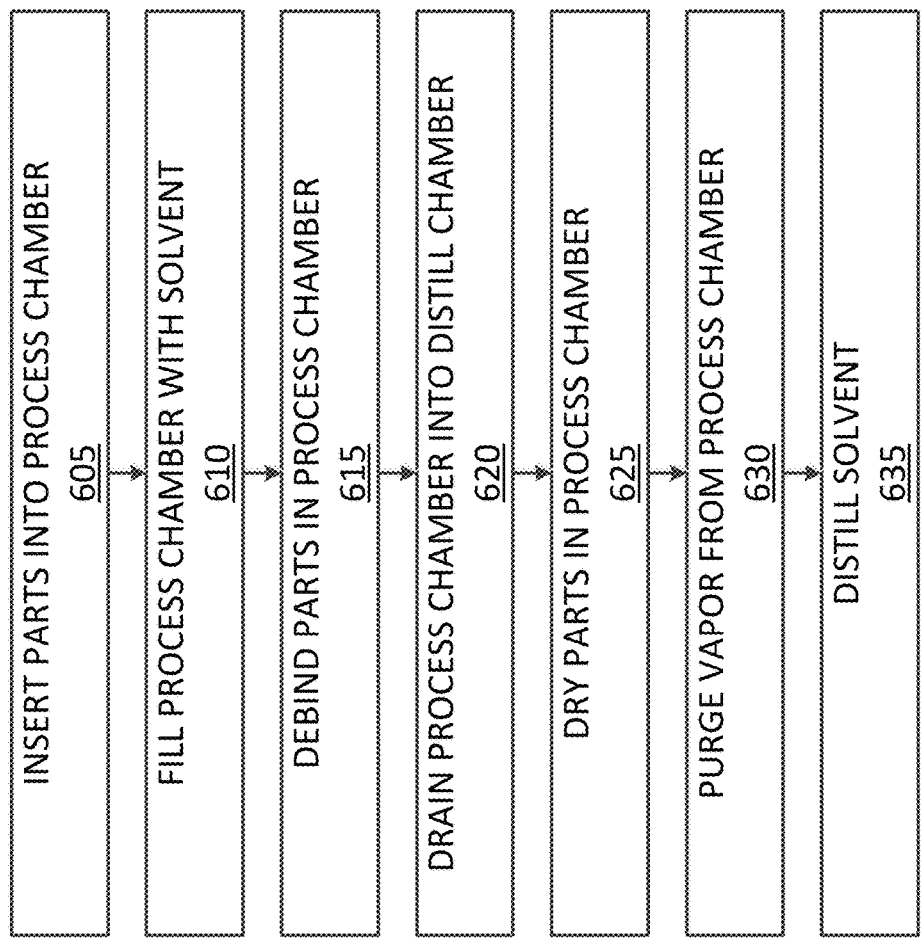
FIG. 6 is a flow diagram of a debinding process.

FIG. 6 is a flow diagram of a debinding process 600 that may be carried out by the debinder systems 400, 500 of FIGS. 4 and 5. With reference to FIG. 4, a user may insert one or more fabricated green parts into a basket within the process chamber 410 (605). The controller 405, communicating with the user via user interface 410, may maintain information regarding the parts for debinding (e.g., material, geometry). Based on this information, the controller 405 may instruct the user on which of the available parts to place in the process chamber 410 and/or how to position and orient the parts in the chamber 410. The controller 405 may also control some or all of the debinding process 600. For example, the controller 405 may determine debind parameters based on the properties of the inserted parts, such as solvent volume in the process chamber, debinding time, and solvent circulation.

After inserting the parts into the process chamber 410 according to the presented instructions, the user may close a lid of the process chamber 410, optionally enter a measured weight of the green parts (which may be used to determine the volume of solvent used), and initiate the debinding process. Once initiated, solvent is pumped from the storage chamber 440 into the process chamber 410 up to a level as determined by the controller 405 (610). The process chamber 410 then raises the temperature of the solvent to a controlled value (e.g., 46° C.) via one or more heaters, and, optionally, engages a pump to circulate the solvent within the process chamber 410 (615). The temperature and circulation may be maintained for a length of time determined by the controller 405 (i.e., "debind time"), and is calculated to provide sufficient debinding based on the geometry and/or weight of the green parts. During this time, the solvent dissolves the binder within the green parts, and the liquid in the process chamber 410 becomes a solution containing the binder.

Upon reaching the debind time, the process chamber 410 drains the solution into the distill chamber 420 (620). Once drained, the temperature in the process chamber 410 may be controlled at a higher temperature (e.g., 50° C.) to facilitate drying of the brown parts (625). During this time, solvent vapor may be vented to the storage chamber 430 and/or to the distill chamber 420. Upon drying the brown parts, the temperature of the process chamber 410 may be reduced (e.g., by disabling the corresponding heater(s)), and a fan or other mechanical means (e.g., a blower, pump, or compressor) may be engaged to facilitate purging the remaining solvent vapor from the process chamber 410 and into the storage chamber 430 and/or to the distill chamber 420 (630). After purging the solvent vapor and, optionally, manually or automatically locking the process chamber 410 for a time allowing the part to cool sufficiently, the user may then open the lid and remove the brown parts from the process chamber 410.

The system 400 may then undergo a process to distill the solvent from the solution drained from the process chamber 410 into the distill chamber 420 (635). The waste chamber 430 may be positioned below the distill chamber 420 and connected by a coupling enabling the solution to flow into the waste chamber 430. The waste chamber 430 (and, optionally, the distill chamber 420) may be heated to a given temperature (e.g., 50° C.) to cause the solvent to evaporate from the solution. The condenser 460 collects the solvent vapors, condenses the vapors to a liquid, and pumps the liquid solvent to the storage tank 440. Concurrently, the waste remaining from the distilling is collected at the bottom of the waste chamber 430.

After the distilling is complete, the waste may be allowed to cool and dry. Periodically, or upon detecting that the collected waste reaches a threshold volume, the waste chamber 430 may be removed and replaced by a replacement waste chamber, or may be removed, emptied of waste, and then reconnected to the distill chamber 420.

Optionally, for parts requiring a larger volume of solvent or longer debinding times, the solvent may be exchanged in the process chamber 410 during a debinding. For example, following draining the process chamber 410 (620), the operations of filling the process chamber with solvent (610), debinding (615) and draining (620) may be repeated prior to drying the parts (625). A distill operation (635) may also be performed for the exchanged solution concurrently with the debinding using the subsequent solvent. Exchanging the solvent during a debinding may improve the effectiveness and debind time particularly for larger or denser parts, or for parts having thicker geometries.

As indicated above, the storage chamber 440 may be filled and refilled with solvent via a port at the storage chamber 440, or may be removed and refilled or replaced by a replacement storage chamber. Alternatively, the storage chamber may be filled with solvent via the process chamber 410. For example, a volume of solvent may be poured into the process chamber 410, where it is permitted to flow into the storage chamber 440. The process chamber 410 may then be purged (630) to ensure that no solvent vapors remain in the process chamber 410. The system 400 may then enable the user to add green parts to initiate the debinding process 500.

As a result of the debinding process 600, the system 400 provides several advantages. By controlling the process parameters (e.g., solvent volume, debind time and circulation) based on the properties of the green parts (e.g., mass and geometry), the system 400 makes efficient use of the solvent. By distilling the solvent after a debinding, the system 400 also conserves and recycles the solvent for future use. The system 400 may be embodied in a compact, self-contained unit that is suitable for an office or workshop environment. In particular, the system 400 can contain all solvent vapor and waste within the unit, thereby maintaining a safe environment around the system 400. Further, the system 400 can be implemented with the controller 405 or another control system (integral to the system 400 or operated by a computer workstation or cloud network) to control the debind process and guide the user on operation (e.g., insertion/removal of parts and waste removal), making the system accessible to a wide range of users.

In further embodiments, the process chamber 410, distill chamber 420, waste chamber 430, and storage chamber 440 may be implemented in alternative configurations. For example, the distill chamber 420 and waste chamber 430 may be implemented as a single chamber, which may be removable to be cleaned of waste and reconnected, or may be replaced by a replacement chamber. Further, the distill chamber 420 and waste chamber 430 may also serve as the storage chamber 440, whereby the distill chamber 420 distills the solvent, via a condenser, into the process chamber 410. In such an embodiment, the process chamber 410 may include divisions or sub-chambers to hold the solvent prior to a debinding operation.

Figure 7:
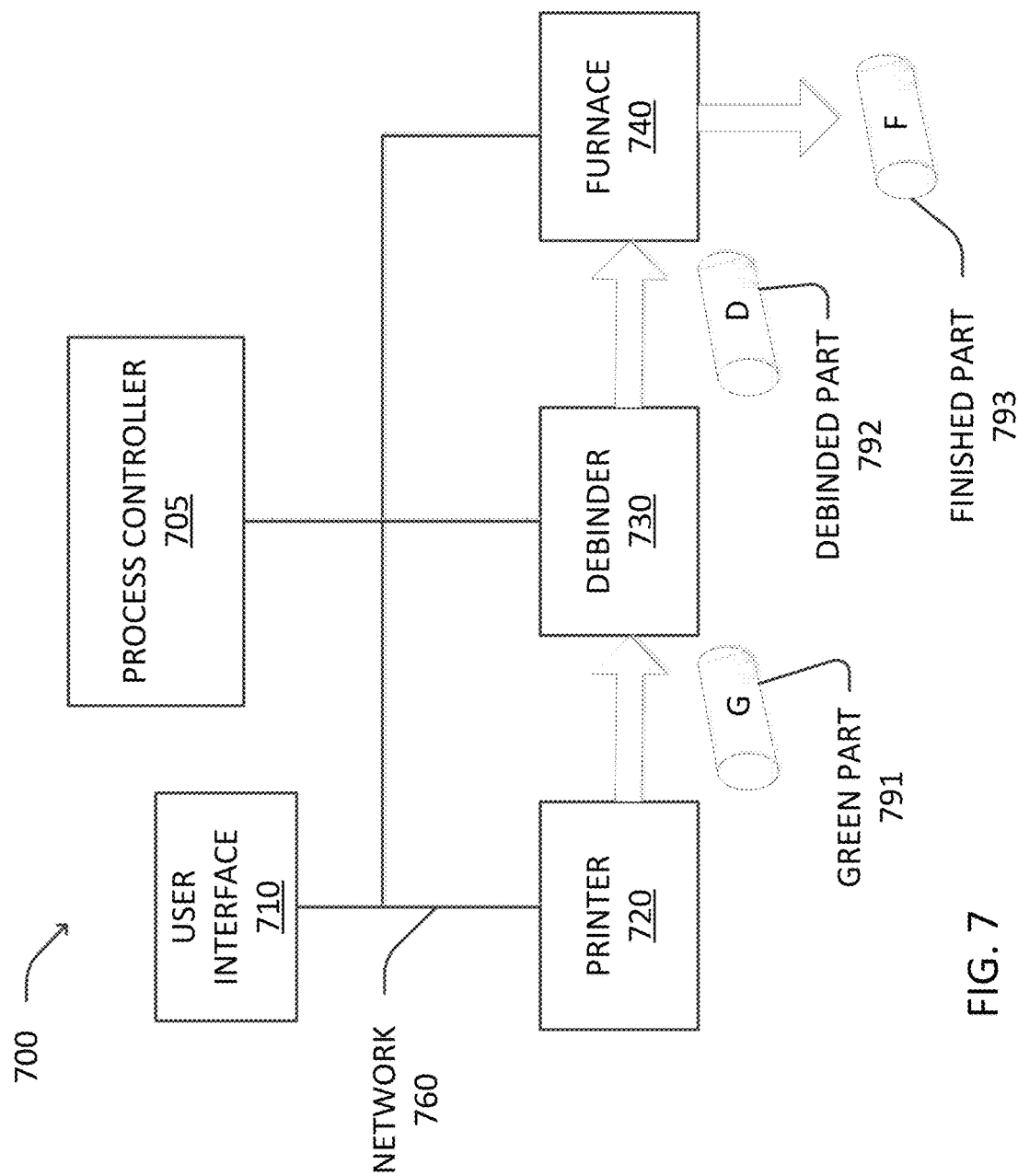
FIG. 7 is a block diagram of an additive manufacturing system.

FIG. 7 is a block diagram of an additive manufacturing system 700. The system 700 may include a printer 720, a debinder 730, and a furnace 740 operating in series to manufacture a finished part 793. In particular, the printer may produce a fabricated green part 791, the debinder 730 debinds the green part 791 to produce a brown (debinded) part 792, and the furnace 740 sinters the brown part 792 to produce the finished part 791. The debinders 400, 500 described above may be implemented in the system 700 as the debinder 730.

The devices 720, 730, 740 may be communicatively coupled to a process controller 705 and user interface 710 via a network 760 (e.g., a wired, wireless and/or cloud network). The process controller 705 may be implemented as a network server, workstation or off-site cloud service, and may communicate with, and control operations at, one or more of the printer 720, debinder 730 and furnace 740. The process controller 705 may also include a distributed processing architecture, where processing elements at the printer 720, debinder 730 and/or furnace 740 perform portions of the control operations. In alternative embodiments, the debinder 730 may be configured to control and manage the manufacturing process, thereby integrating some or all functions of the process controller 705 described below. The user interface 710 may comprise one or a plurality of devices connected to the network 760, such as a laptop, workstation, mobile device (e.g., smartphone, tablet), and/or or touchscreens integrated into the printer 720, debinder 730 and/or furnace 740.

Via the user interface 710, a user may communicate with the process controller 705 to indicate one or more parts to be manufactured. In response, the process controller 705 can manage the entire manufacturing process, controlling the printer 720, debinder 730 and furnace 740 to manufacture to produce the green part 791, brown part 792 and finished part 793, respectively, and instructing the user via the user interface 710 as necessary to manipulate the parts during the process.

The system 700 may incorporate one or more features of the printer 100, system 300, and debinders 400, 500 described above with reference to FIGS. 1-6. For example, the printer 720 may incorporate features of the printers 100, 300 and the process controller 705 may include features of the control system 118 and database 120. The debinder 730 may incorporate one or more features of the debinders 400, 500. Further, the debinder 730 and furnace 740 may incorporate features of the post-processing station 306, and the system 700 may carry out the manufacturing process 200 to fabricate a part.

Figure 8:
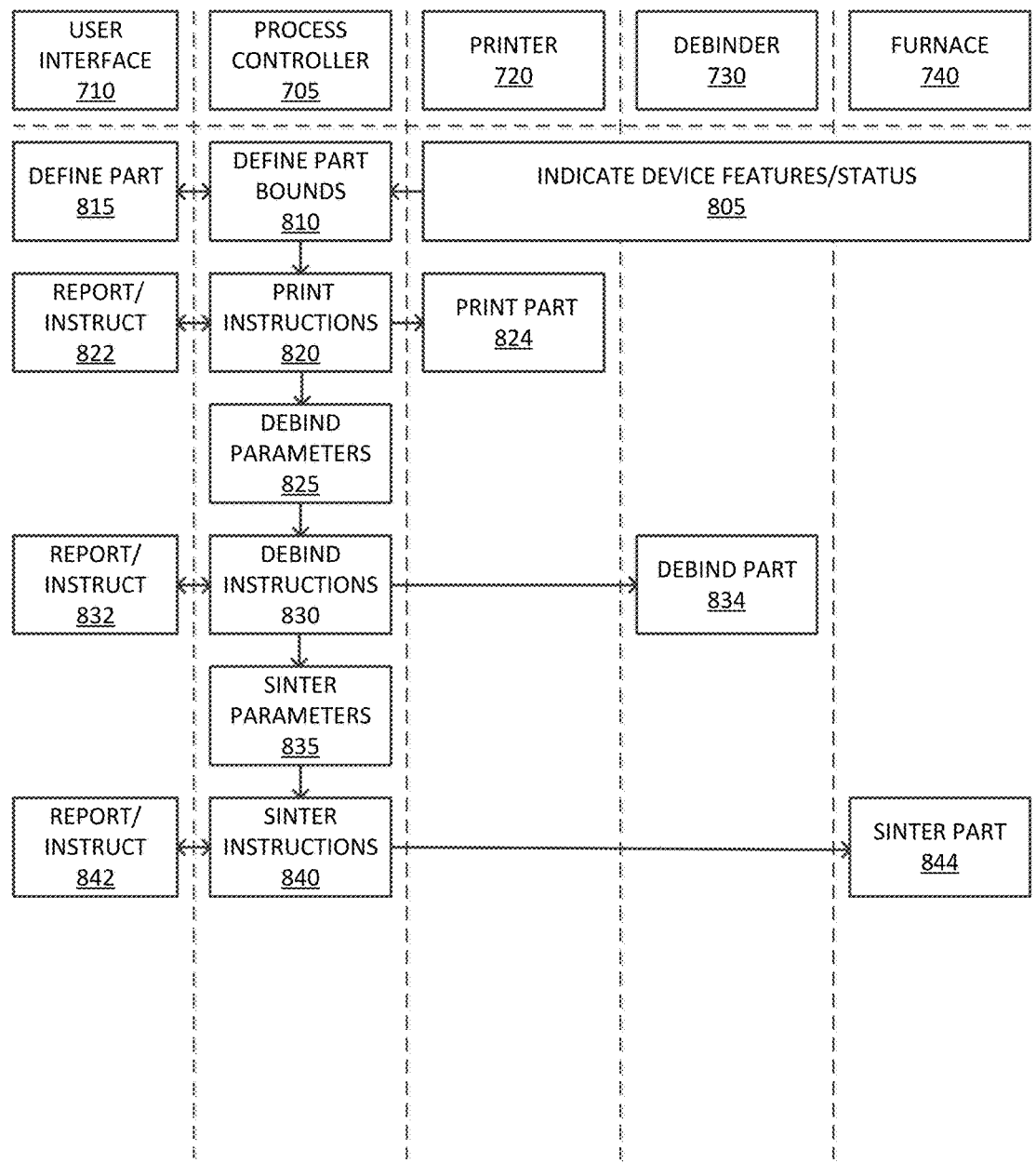
FIG. 8 is a flow diagram of a process of fabricating a part.

FIG. 8 is a flow diagram of a process 800 of fabricating a part that may be carried out by the system 700 of FIG. 7. With reference to FIG. 7, upon initial setup or in response to a prompt, the printer 720, debinder 730 and furnace 770 may communicate with the controller 705 to convey the features and/or status of each of the devices (805). For example, the devices 720 can indicate 1) capacities for accommodating parts of a maximum size and/or thickness, 2) build materials available and quantities thereof, and 3) errors, alerts or other notifications that may affect or limit the manufacturing process. Based on this information, the controller 705 can define part bounds, which can specify maximum part geometries, quantities and/or constituent materials (810).

A user may define a part (or parts) to be manufactured via the user interface 710 (815). To do so, a user may select a part from a menu at the user interface 710, may import data for the part, or may design the part directly at the user interface 710. The part may be defined by geometric parameters (e.g., a CAD file) and material(s) from which the part is to be fabricated. The user may make further adjustments to the geometric parameter, such as scaling up or scaling down the size of the finished part. Based on the desired properties of the finished part 791 (e.g., part geometry and material composition), as well as the anticipated effects on the part exerted by the printer 720, debinder 730 and furnace 770, the process controller 705 may generate print instructions for printing the part (820). The print instructions may include a toolpath (e.g., gcode) and related parameters that are transmitted to the printer 720, which then prints the green part 791 in accordance with the instructions (824). The controller 705 may also report a print status to the user via the user interface 710, and may also instruct the user on operating the printer 720 before, during and/or after the print (822). For example, the user interface 522 may display instructions for initializing or activating the printer 720, performing printer maintenance (e.g., cleaning the print nozzle or loading build material), and removing the printed green part 791 from the printer 720 once the printing is completed. The controller 705 may issue such reports and instructions based on status reports conveyed by the printer (e.g., 505) as well as the print instructions Following the printing of the green part 791, the controller 705 may determine parameters for debinding the green part 791 in the debinder 730 (825). For example, the controller 705 may determine a volume of solvent required to debind the part, a length of time to immerse the part in the solvent, circulation of the solvent, and whether to exchange solvent during the debind. If more than one green parts are available, then the controller 705 may also define a batch of parts that can be debound together. The controller 705 may determine such debind parameters based on the properties of the green part 791 (and other green parts, if available), including the geometry, material, thickness and mass of the green part 791. For example, the controller 705 may determine that a part having thicker features or greater mass may require a longer solvent immersion time. The properties of the green part 791 may be measured directly by the user and entered at the user interface 710, or may be estimated based on the print parameters for the part. The controller may also determine the debind parameters based on the capacity or status of the debinder 730 as communicated by the debinder 730 (e.g., 505).

Based on the debind parameters, the controller 705 determines debind instructions for the user interface 710 and debinder 730 (830). For the user interface 710, the controller 705 may present a menu of options and instructions to the user (see, e.g., FIG. 9, described below) (832). For example, the user interface 710 may 1) allow selection of one or more parts to debind, 2) instruct the user on how to place and orient the selected part(s) within a process chamber of the debinder 730, and 3) instruct the user regarding any maintenance required at the debinder 730 (e.g., removing waste or adding solvent). For the debinder 730, the controller 705 may initiate and manage the debind process based on the debind parameters and the aforementioned user input (834). For example, for the given selection of part(s), the controller 705 may configure the volume of solvent used, solvent immersion time, circulation of the solvent, whether to exchange solvent during the debind, and drying time and temperature. Once the debind is complete, the controller 705 may then instruct the user, via the user interface 710, to open the process chamber of the debinder 730 and remove the brown part(s) 792 (832).

Following the debinding, the controller 705 may determine parameters for sintering the brown part 792 in the furnace 740 (835). For example, the controller 705 may determine parameters including one or more of sintering time, temperature, gas flow rate and furnace load (i.e. a selection of parts that may be sintered concurrently). The controller 705 may determine the sinter parameters based on the properties of the brown part 792 (and other parts, if sintering concurrently), including the geometry, material, thickness and mass of the brown part 792. For example, the controller 705 may determine that a part having thicker features or greater mass may require a longer solvent immersion time. The properties of the brown part 792 may be measured directly by the user and entered at the user interface 710, or may be estimated based on the print parameters for the part. The controller 705 may also determine the sinter parameters based on the capacity or status of the furnace 740 as communicated by the furnace 740 (e.g., 505).

In an example illustrating determination of sinter parameters, the brown part 792 may be printed from 4140 alloy nominal feedstock steel. The user may select, for example, a particular material content (e.g., carbon content) of the constituent 4140 alloy steel to be present in the steel after sintering. The controller 705 may evaluate the desired carbon content input from the user and generate therefrom the sinter parameters to produce a desired carburization/decarburization effect. For example, the sinter parameters may include a configuration of the gas flow rate within furnace 740.

Adjusting the carbon content of the 4140 alloy steel may produce a wide range of ductility and/or hardness to the user for alloy steels. The user may enter a given ductility and/or hardness as a desired property at the user interface 710, and in response, the controller 705 may determine the required carbon content to achieve the desired ductility and/or hardness, and then determine the sinter parameters to produce the determined carbon content of the finished part 793. The carbon content of the finished part 793 can be altered by furnace load (i.e., the total mass of parts placed in the furnace 740) as well as gas flow rate. This is due to the effect of binder amount on carburizing potential of sintering process. Furnace load and gas flow rate are thus two sinter parameters that the controller 705 may determine and provide to the furnace 740 to adjust the final microstructure of the finished part 793, while keeping other sinter parameters (e.g., temperature, time, etc.) constant.

The controller 705 may also provide furnace load recommendations to the user via the user interface 710, allowing the user to manually adjust the furnace load. Alternatively, the furnace 740 may automatically adjust the furnace load based on sinter parameters communicated to it by the controller 705. Further, the user may enter at the user interface 710 a selection of multiple parts to be sintered concurrently and/or the total mass of the parts to be sintered in a given sintering run, along with the desired microstructure. The controller 705 may then determine, based on the total mass of the parts and desired microstructure for a particular production run, the gas flow needed to achieve that microstructure in that particular production run.

The controller 705 may sintering parameters, as a function of the input materials properties, based on a fixed mapping. In such cases, the controller 705 may employ a look-up table (LUT), implemented in local memory, to accomplish the mapping. The contents of the LUT may be generated empirically, based on actual production runs. The contents of the LUT may alternatively be generated analytically according to formulae based on established materials theory. Alternatively, the controller 705 may produce the sinter parameters analytically, in real-time or near real-time, by a processor executing instruction code that evaluates the input materials properties according to formulae based on established materials theory.

The controller may provide further sinter parameters to accommodate particular materials or produce specific effects in the finished part 793. For example, the oxygen content in the gas flow may be varied for processing titanium-based alloys to provide variations in hardness vs. ductility of the part material, or to produce hardened oxide layers on a material such as titanium or aluminum. The controller 705 may also define sinter parameters specifying a particular cool-down rate. For example, one cool down rate may be defined for banite, and a slower cool down rate may be defined for ferrite. The controller 705 may define sinter parameters that adjust the internal sintering furnace atmosphere, vacuum level and the furnace loading, to selectively harden/carburize the parts. Certain parts may only require a selected region to be hardened (e.g., the teeth of a gear), but require other regions of the part maintain ductility (e.g., thin sections that are prone to embrittlement when too hard/carburized). Accordingly, the controller 705 may direct the printer 720 to print a thin stop-off layer on selected surfaces to prevent carburization of those selected surfaces, resulting in selective carburizing at the furnace 740.

If the brown part 792 contains substantial amounts of binding agents (e.g., as a result of incomplete debinding), the binding agents may affect the carbon content of the final part 793. In such a case, the sections under the thin stop-off described above may pick up carbon due to prolonged exposure to carbon from the binder and become harder selectively. Thus, the controller 705 may configure the sinter parameters to selectively distribute the stop-off to facilitate the sintering of functionally gradient steel. Similar techniques of distributing stop-off material may alternatively be used for oxygen hardening of titanium to facilitate the sintering of functionally gradient titanium. Similar techniques may apply to other processes, for example for processing titanium with oxygen hardening.

Based on the sinter parameters, the controller 705 determines sinter instructions for the user interface 710 and debinder 730 (840). For the user interface 710, the controller 705 may present a menu of options and instructions to the user (842). For example, the user interface 710 may 1) allow selection of one or more parts to sinter, 2) instruct the user on how to place and orient the selected part(s) within the furnace 740, and 3) instruct the user regarding any maintenance required at the furnace 740. For the furnace 740, the controller 705 may initiate and manage the sinter process based on the sinter parameters and the aforementioned user input (844). For example, for the given selection of part(s), the controller 705 may control the temperature, time, gas flow, oxygen content, and other parameters of the furnace 740 as described above. Once the sinter is complete, the controller 705 may then instruct the user, via the user interface 710, to open the process chamber of the furnace 740 and remove the finished part(s) 793 (842).

In order to increase efficiency of the manufacturing process, the controller 705 may also manage a plurality of queues. For example, the controller may maintain 1) a queue of parts to be printed, 2) a list of parts at each stage of the manufacturing process (i.e., printed, debound, sintered), and 3) the operational status of each device. Based on this information, the controller 705 can define a local order of operations (e.g., a part queue) at each device, prioritizing and grouping parts to manufacture the parts more quickly and utilize resources (e.g., feedstock, solvent) most efficiently.

In configuring the print, debind and sinter parameters and controlling the devices as described above, the controller 705 may calculate an anticipated transformation of the part at each stage in the manufacturing process. For example, the controller may calculate an anticipated 1) deformation of a part surface during the printing as a result of the part geometry and mass, 2) a portion of the part that may retain binder after debinding, or 3) uniform or uneven shrinkage of the part during sintering. Similarly, the controller 705 may calculate anticipated properties of the green part 791, brown part 792 and/or finished part 793 (including any transformations) prior to beginning the print. In response, the controller 705 may configure the print, debind and/or sinter parameters to compensate for the anticipated transformation at the same or different stage of the manufacturing process.

Thus, the controller 705 can perform a predictive analysis of the manufacturing process. For example, by analyzing the initial properties of the part to be manufactured (e.g., geometry and materials), the effects on the part exerted by each of the printer 720, debinder 730 and furnace 740 (via empirical observation and/or modeling), and the desired properties of the finished part 791, the controller 705 may then control the system 700 to ensure that the finished part 791 is produced within acceptable tolerances. By tracking operations at each of the devices in the system 700, as well as the status of each of the unprinted, green and brown parts within the manufacturing queue, the controller 705 can optimize the efficiency of the system 700. For example, the controller 705 can group multiple parts for printing, debinding or sintering, and can define a part queue at each of the printer 720, debinder 730 and furnace 740 to efficiently occupy the runtime of each device. Further, the process controller 705 order a part within the queue based on the properties of the part relative to properties of other parts in the queue. The debind process 600, described above with reference to FIG. 6, may be incorporated into the process 800, and particularly the operations of defining the debind parameters 825, determining the debind instructions 830, interfacing with the user 832, and debinding the part 834.

Figure 9:
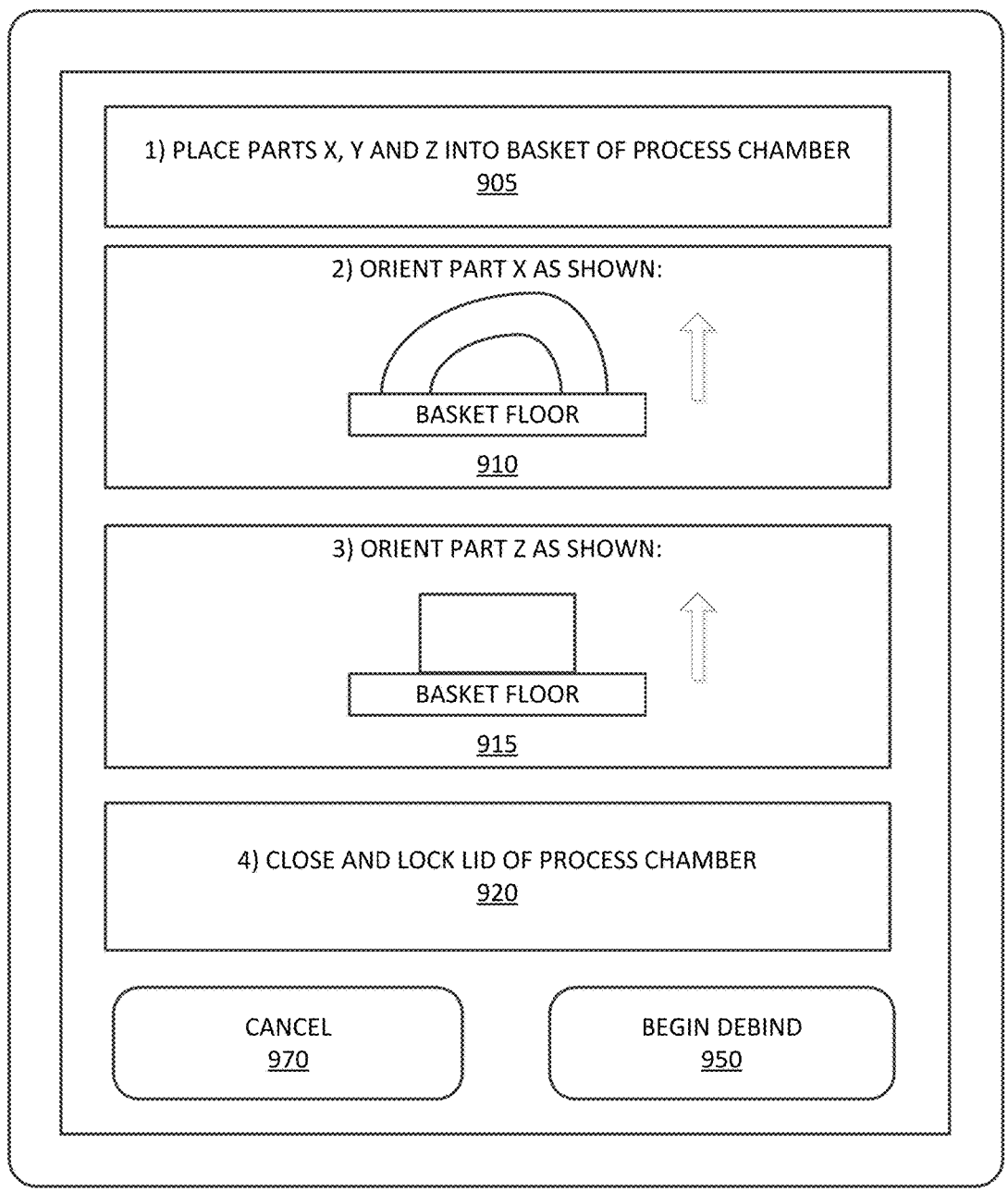
FIG. 9 illustrates a user interface configured to guide a debind process.

FIG. 9 illustrates a display 900 presented by a user interface and configured to guide the user through a debind process. With reference to FIGS. 7 and 8, the display 900 may be presented by the user interface 710 (e.g., a touchscreen component the debinder 730, or a display of a computer terminal connected to the network 760) before beginning the debind process (834), as a portion of the interaction with the user regarding the debind (832). The display 900 may be preceded by another menu allowing the user to select the part(s) for debinding. As shown, the display 900 presents a series of instructions guiding the user in preparing the green part(s) and debinder for the debind process. First, the display 900 instructs the user to place the selected parts (identified by corresponding codes, names or illustrations) into the basket of the process chamber of the debinder (905). For parts requiring a particular orientation in the process chamber, the display may then instruct the user on how to orient those parts, providing an illustration for each (910, 915). Once the parts are placed and oriented (and, optionally, the user verifies the same through the user interface 910), the display 900 instructs the user to close and/or lock the lid of the process chamber (920). The user may then select a button to begin the debind (950) or cancel (970).

Figure 10:
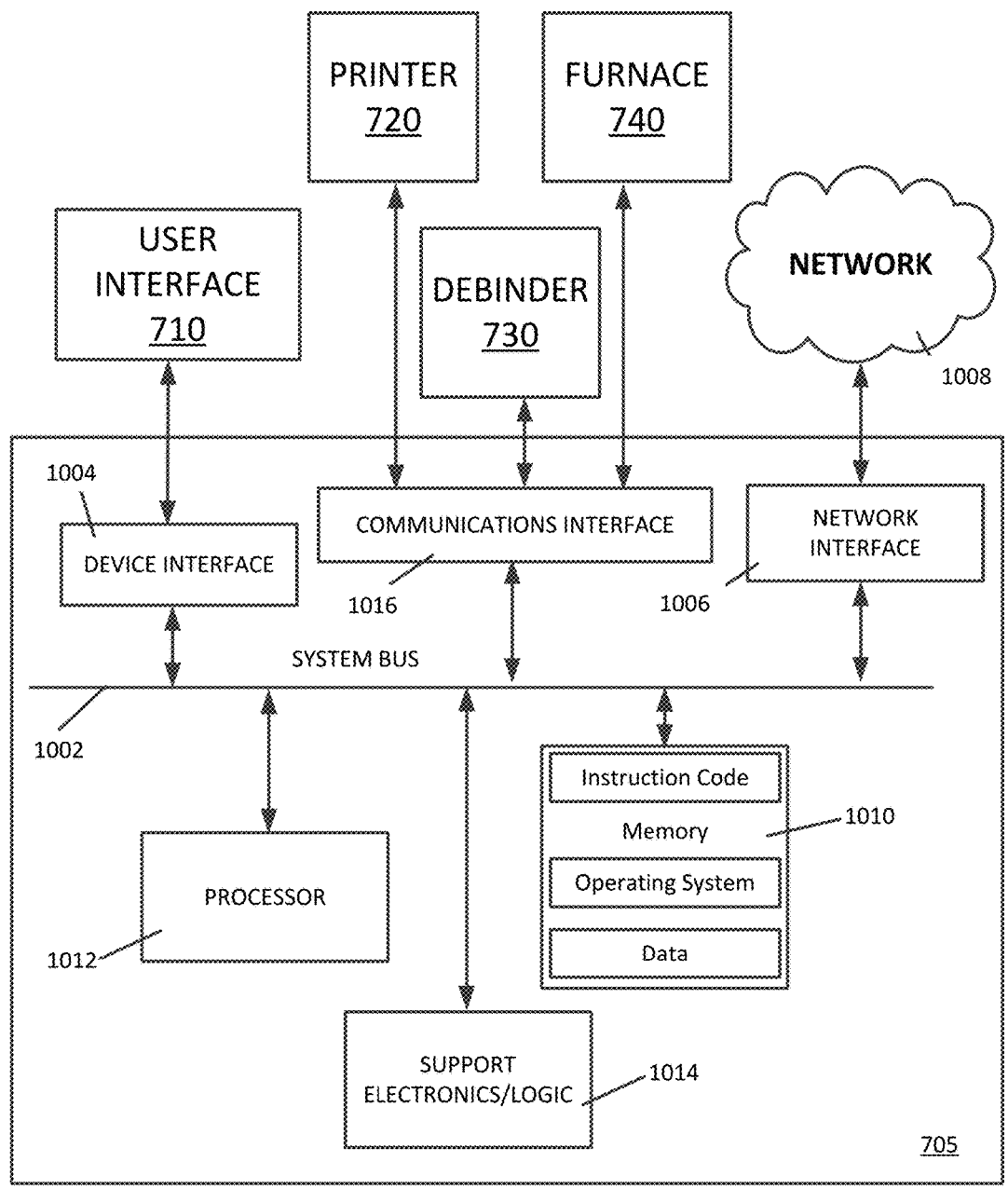
FIG. 10 is a block diagram of a processing system in which example embodiments may be implemented.

FIG. 10 is a diagram of an example internal structure of the process controller 705. As described above, the controller 705 may be implemented as one or more of a network server, workstation or off-site cloud service. The controller 705 may also be integrated, wholly or partially, into the debinder 730, wherein the debinder 730 may perform some or all of the operations of the controller 705 described above. As shown in FIG. 10, the controller 705 is implemented as a server in an example embodiment, where the printer 720, debinder 730, and furnace 740 are communicatively coupled to the process controller 705 via a local communications interface 316. Alternatively, the controller may communicate with the devices 710, 720, 730, 740 via a network 1008 (e.g., a wired, wireless and/or cloud network).

The controller 705 may contain a system bus 1002, being a set of hardware lines used for data transfer among the components of a computer or processing system. Attached to the system bus 1002 is a user I/O device interface 1004 for connecting the user interface 710 and/or various input and output devices (e.g., keyboard, mouse, displays, printers, speakers, etc.) to the controller 705. A network interface 1006 allows the computer to connect to various other devices attached to the network 1008. Memory 1010 provides volatile and non-volatile storage for information such as computer software instructions used to implement one or more of the embodiments of the present invention described herein, for data generated internally and for data received from sources external to the controller 705. A central processor unit 1012 may also be attached to the system bus 1002, and provides for the execution of computer instructions stored in memory 1010. The controller 705 may also include support electronics/logic 1014.

In one embodiment, the information stored in memory 1010 may comprise a computer program product, such that the memory 1010 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

The process controller 705 may also include a distributed processing architecture, where processing elements at the printer 720, debinder 730 and/or furnace 740 perform portions of the control operations. The user interface 710 may comprise one or a plurality of devices in communication with the controller 705, such as a laptop, workstation, mobile device (e.g., smartphone, tablet), and/or or touchscreens integrated into the printer 720, debinder 730 and/or furnace 740.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware, it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While example embodiments have been particularly shown and described, it will be understood by those skilled in the art that various changes in form and details may be made therein without departing from the scope of the embodiments encompassed by the appended claims.

What is claimed is:

1. A system to print and debind a 3D printed metal part, comprising:
   a printer configured to print the 3D printed metal part;
   a storage chamber configured to store a liquid solvent for debinding the 3D printed metal part;
   a process chamber configured to debind the 3D printed metal part using a volume of the liquid solvent transferred from the storage chamber and to dry the 3D printed metal part;
   a distill chamber configured to collect a solution drained from the process chamber and to produce a solvent vapor from the solution; and
   a condenser configured to condense the solvent vapor to the liquid solvent and to transfer the liquid solvent to the storage chamber.

2. The system of claim 1, wherein the storage chamber includes at least one closeable port to receive the liquid solvent, and wherein the storage chamber, the process chamber, the distill chamber, and the condenser are housed within a self-contained and fluid-tight unit to form a closed system.

3. The system of claim 2, wherein the process chamber includes a lid that is movable to allow access to the interior of the process chamber, and wherein the lid is configured to automatically lock during a debind process.

4. The system of claim 1, wherein the distill chamber is also configured to collect a waste component of the solution.

5. The system of claim 1, further comprising a waste chamber removably coupled to the distill chamber and configured to collect a waste component of the solution.

6. The system of claim 5, wherein the waste chamber is removably coupled to the distill chamber via a waste latch.

7. The system of claim 1, wherein the process chamber is configured to heat the 3D printed metal part in order to dry the 3D printed metal part and to vaporize at least a portion of the liquid solvent.

8. The system of claim 7, further comprising a purging device configured to remove at least a portion of the solvent vapor from the process chamber.

9. The system of claim 8, wherein the purging device includes a fan, a blower, a pump, or a compressor.

10. The system of claim 1, further comprising a controller configured to determine one or more parameters of the debinding based on one or more properties of the 3D printed metal part, and wherein the controller is further configured to instruct a user, via a user interface, to position the 3D printed metal part in one or more locations within the process chamber.

11. The system of claim 10, wherein the one or more properties of the 3D printed metal part include at least one of a geometry or a mass, and wherein the one or more parameters include at least one of a debind time, a circulation of the solvent, or a solvent exchange during the debind.

12. A system to print and debind a 3D printed metal part, comprising:
   a printer configured to print the 3D printed metal part;
   a storage chamber configured to store a liquid solvent for debinding the 3D printed metal part;
   a process chamber configured to debind the 3D printed metal part using a volume of the liquid solvent transferred from the storage chamber, wherein the process chamber is also configured to heat and to dry the 3D printed metal part;
   a distill chamber configured to 1) collect a solution drained from the process chamber, 2) produce a solvent vapor from the solution, and 3) collect a waste component of the solution; and
   a condenser configured to condense the solvent vapor to the liquid solvent and to transfer the liquid solvent to the storage chamber.

13. The system of claim 12 wherein the storage chamber includes at least one closeable port configured to receive the liquid solvent, and wherein the storage chamber, the process chamber, and the distill chamber are contained within a self-contained and fluid-tight unit to form a closed system.

14. The system of claim 12, further comprising a purging device configured to remove at least a portion of the solvent vapor from the process chamber.

15. The system of claim 14, wherein the purging device includes a fan, a blower, a pump, or a compressor.

16. The system of claim 12, further comprising a controller configured to determine one or more parameters of the debinding based on one or more properties of the 3D printed metal part, and wherein the controller is further configured to instruct a user, via a user interface, to position the 3D printed metal part in one or more locations within the process chamber.

17. The system of claim 16, wherein the one or more properties of the 3D printed metal part include at least one of a geometry or a mass, and wherein the one or more parameters include at least one of a debind time, a circulation of the solvent, or a solvent exchange during the debind.

18. The system of claim 12, wherein the process chamber includes a lid that is movable to allow access to the interior of the process chamber, wherein the lid is configured to automatically lock during a debind process.

19. A system to print and debind a 3D printed metal part, comprising:
   a printer configured to print the 3D printed metal part;
   a process chamber configured to debind a 3D printed metal part using a volume of a liquid solvent and to dry the 3D printed metal part;
   a distill chamber configured to collect a solution drained from the process chamber and to produce a solvent vapor from the solution;
   a condenser configured to condense the solvent vapor to the liquid solvent and to transfer the liquid solvent to the process chamber; and
   a purging device configured to remove at least a portion of the solvent vapor from the process chamber,
   wherein the process chamber, the distill chamber, the condenser, and the purging device form a closed system and are contained within a standalone fluid-tight unit.

20. The system of claim 19, wherein the purging device includes a fan, a blower, a pump, or a compressor.

21. The system of claim 19, further comprising a waste chamber coupled to the distill chamber, wherein the waste chamber is removably coupled to the distill chamber via a waste latch.

22. The system of claim 19, wherein the process chamber is configured to heat the 3D printed metal part in order to dry the 3D printed metal part and to vaporize at least a portion of the liquid solvent.

23. The system of claim 19, wherein the process chamber includes a lid that is movable to allow access to the interior of the process chamber, wherein the lid is configured to automatically lock during a debind process.

24. A system to print and debind one or more 3D printed metal parts, comprising:
   a printer configured to print the one or more 3D printed metal parts;

a process chamber configured to debind the one or more 3D printed metal parts using a volume of a liquid solvent and to dry the one or more 3D printed metal parts;

a distill chamber configured to collect a solution drained from the process chamber and to produce a solvent vapor from the solution;

a condenser configured to condense the solvent vapor to the liquid solvent and to transfer the liquid solvent to the process chamber;

a purging device configured to remove at least a portion of the solvent vapor from the process chamber, and a controller configured to determine one or more parameters of the debinding based on one or more properties of the one or more 3D printed metal parts, wherein the process chamber, the distill chamber, the condenser, and the purging device form a closed system and are contained within a fluid-tight unit.

25. The system of claim 24, further comprising a user interface, wherein the controller is further configured to instruct a user, via the user interface, to position the one or more 3D printed metal parts in one or more locations within the process chamber, wherein the one or more properties of the one or more 3D printed metal parts include at least one of a geometry or a mass, and wherein the one or more parameters include at least one of a debind time, a circulation of the solvent, or a solvent exchange during the debind.

26. The system of claim 24, wherein the process chamber includes a lid that is movable to allow access to the interior of the process chamber, wherein the lid is configured to automatically lock during a debind process.

* * * * *